(12) United States Patent
Kurasawa et al.

(10) Patent No.: US 9,946,126 B2
(45) Date of Patent: *Apr. 17, 2018

(54) DISPLAY DEVICE AND ELECTRONIC APPARATUS

(71) Applicant: Japan Display Inc., Tokyo (JP)

(72) Inventors: Hayato Kurasawa, Tokyo (JP); Toshiharu Matsushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,457

(22) Filed: Jun. 5, 2017

(65) Prior Publication Data

US 2017/0277005 A1    Sep. 28, 2017

Related U.S. Application Data

(63) Continuation of application No. 14/263,201, filed on Apr. 28, 2014, now Pat. No. 9,696,599.

(30) Foreign Application Priority Data

May 28, 2013    (JP) ................................ 2013-111590

(51) Int. Cl.
*G02F 1/1343* (2006.01)
*G02F 1/1337* (2006.01)

(52) U.S. Cl.
CPC .. *G02F 1/134336* (2013.01); *G02F 1/133707* (2013.01); *G02F 1/134363* (2013.01); *G02F 2001/134381* (2013.01); *G02F 2201/124* (2013.01); *G02F 2201/128* (2013.01)

(58) Field of Classification Search
CPC ... G02F 1/134363; G02F 2001/134372; G02F 2001/134381; G02F 1/133707; G02F 2201/124; G02F 2201/138
See application file for complete search history.

(56) References Cited

U.S. PATENT DOCUMENTS

| | | | |
|---|---|---|---|
| 2007/0153202 A1 | 7/2007 | Kang | |
| 2008/0198318 A1* | 8/2008 | Lee | G02F 1/134363 349/141 |
| 2009/0109391 A1 | 4/2009 | Ito et al. | |
| 2012/0162589 A1* | 6/2012 | Yoso | G02F 1/134363 349/126 |

FOREIGN PATENT DOCUMENTS

JP    2008-052161    3/2008

* cited by examiner

*Primary Examiner* — Jessica M Merlin
(74) *Attorney, Agent, or Firm* — Michael Best & Friedrich LLP

(57) ABSTRACT

According to an aspect, a display device has a first electrode, a second electrode and liquid crystal layer. When a voltage is not applied to the first and second electrodes, the major axes of the liquid crystal molecules are oriented in a third direction. When a voltage is applied between the first and second electrodes, the major axes are oriented so as to rise in a direction perpendicular to a first substrate while rotating clockwise in a vicinity of one of long sides of comb tooth portion that face each other and counterclockwise in a vicinity of the other of the long sides. An angle between an electrode base-side portion of a long side of each comb tooth portions and the third direction is larger than an angle between a distal end-side portion of the long side of each comb tooth portions and the third direction.

4 Claims, 28 Drawing Sheets

LOWER HOUSING 552
553 COUPLING PART
551 UPPER HOUSING

UPPER HOUSING 551
552 LOWER HOUSING 562
561

DISPLAY DEVICE AND ELECTRONIC APPARATUS

CROSS-REFERENCE TO RELATED APPLICATIONS

The present application is a Continuation of application Ser. No. 14/263,201, filed Apr. 28, 2014, which claims priority from Japanese Application No. 2013-111590, filed on May 28, 2013, the contents of which are incorporated by reference herein in its entirety.

BACKGROUND

1. Technical Field

The present disclosure relates to a display device having a liquid crystal. The present disclosure also relates to an electronic apparatus including a display device having a liquid crystal.

2. Description of the Related Art

As a system (mode) for driving a liquid crystal, there has been known a liquid crystal driving system using a so-called vertical electric field which is generated in a vertical direction between substrates. As a liquid crystal display device that uses such a vertical electric field to drive the liquid crystal, there have been known a twisted nematic (TN) liquid crystal display (LCD) device, a vertical alignment (VA) LCD device, and an electrically controlled birefringence (ECB) LCD device. There is also known a liquid crystal driving system which uses a so-called transverse electric field generated in a direction (transverse direction) parallel to the substrate as disclosed in Japanese Patent Application Laid-open Publication No. 2008-52161 (JP-A-2008-52161). As a liquid crystal display device that uses such a transverse electric field to drive a liquid crystal, there have been known a fringe field switching (FFS) LCD device and an in-plane switching (IPS) LCD device.

In the above-described liquid crystal display device of the transverse electric field-type, an electric field is generated between a first electrode and a second electrode in a direction parallel to the substrate, so that liquid crystal molecules are rotated in a plane parallel to the substrate surface. Display operation is performed by using a change in optical transmittance corresponding to the rotation of the liquid crystal molecules. It is demanded to improve response speed of the liquid crystal in the liquid crystal display device of the transverse electric field type. In order to improve the response speed, the first electrode or the second electrode may be formed into a certain shape that may possibly compromise the stability in liquid crystal molecular orientation and/or may degrade optical transmittance. The stability in liquid crystal molecular orientation being compromised means that the liquid crystal molecules are likely to be aligned in the direction opposite to a desired direction.

For the foregoing reasons, there is a need for a display device and an electronic apparatus including the display device that can improve the response speed while harmonizing the improvement of stability in liquid crystal molecular orientation and the improvement of optical transmittance.

SUMMARY

According to an aspect, a display device includes: a first substrate that has a first electrode and a second electrode, the first electrode including an electrode base extending in a first direction and a plurality of comb tooth portions having comb-teeth-like shape, which extend in a second direction different from the first direction, and which protrude from the electrode base at constant intervals from each other by slits, each of the comb tooth portions having a joint portion with the electrode base being laminated on an upper or lower side thereof; a second substrate that faces the first substrate; and a liquid crystal layer disposed between the first substrate and the second substrate. When a voltage is not applied to the first electrode and the second electrode, the major axes of the liquid crystal molecules are oriented so as to be aligned in a third direction parallel to the second direction. Whereas when a voltage is applied between the first electrode and the second electrode, the major axes of the liquid crystal molecules are oriented so as to rise in a direction perpendicular to the first substrate while rotating in an in-plane direction of the first substrate, clockwise in a vicinity of one of long sides of the comb tooth portions that face each other in a width direction of the slits and counterclockwise in a vicinity of the other of the long sides. An angle formed between an electrode base-side portion of a long side of each of the comb tooth portions and the third direction is larger than an angle formed between a distal end-side portion of the long side of each of the comb tooth portions and the third direction.

According to another aspect, a first substrate that has a first electrode and a second electrode, the first electrode including an electrode base extending in a first direction and a plurality of comb tooth portions having comb-teeth-like shape, which extend in a second direction different from the first direction, and which protrude from the electrode base like teeth of a comb at constant intervals from each other by slits, each of the comb tooth portions having a joint portion with the electrode base being laminated on an upper or lower side thereof; a second substrate that faces the first substrate; and a liquid crystal layer disposed between the first substrate and the second substrate. When a voltage is not applied to the first electrode and the second electrode, the major axes of the liquid crystal molecules are oriented so as to be aligned in a third direction orthogonal to the second direction. Whereas when a voltage is applied between the first electrode and the second electrode, the major axes of the liquid crystal molecules are oriented so as to rise in a direction perpendicular to the first substrate while rotating, in an in-plane direction of the first substrate, clockwise in a vicinity of one of long sides of the comb tooth portions that face each other in a width direction of the slits and counterclockwise in a vicinity of the other of the long sides. An angle formed between an electrode base-side portion of a long side of each of the comb tooth portions and the second direction is larger than an angle formed between a distal end-side portion of the long side of each of the comb tooth portions and the second direction.

According to another aspect, an electronic apparatus includes: one of the display devices; and a controller that supplies an input signal to the display device.

DETAILED DESCRIPTION OF THE PREFERRED EMBODIMENTS

The modes (embodiments) for carrying out the present disclosure will be described in detail with reference to the accompanying drawings. It should be understood that the present disclosure is not limited by the details of the following embodiments. Constituent elements described hereinbelow include those easily perceived by a person skilled in the art and those substantially identical. Further, the constituent elements described hereinbelow can appropriately be combined as necessary. The description will be given in the order shown below:
1. Embodiments (display device)
2. Application examples (electronic apparatus)

Examples of applying the display device according to any of the embodiments to the electronic apparatus

1. EMBODIMENTS (DISPLAY DEVICE)

1-1. First Embodiment

Figure 1:
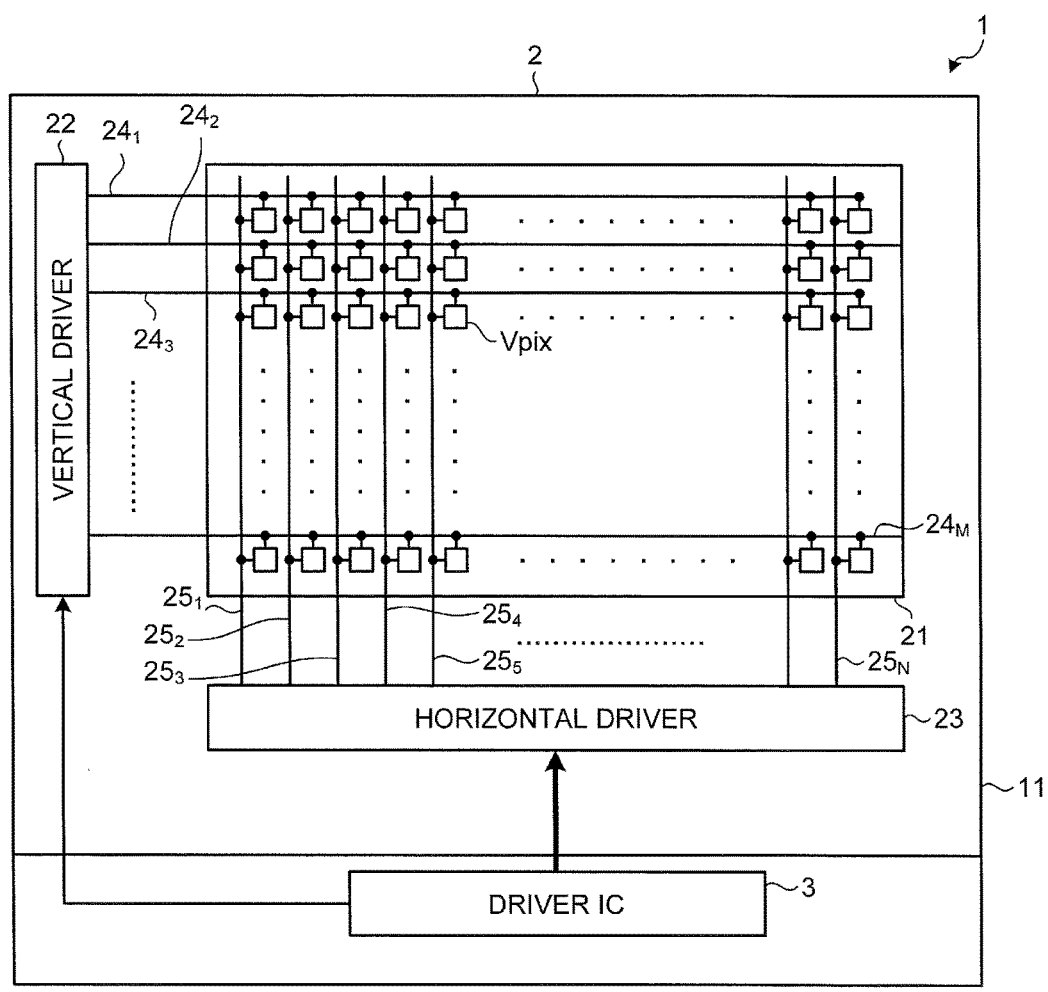
FIG. 1 is a block diagram illustrating a system configuration example of a display device according to a first embodiment.

FIG. 1 is a block diagram illustrating a system configuration example of a display device according to a first embodiment. A display device 1 corresponds to one illustrative example of "the display device" of the present disclosure.

The display device 1 is a transmissive or semi-transmissive liquid crystal display device. The display device 1 includes a display panel 2 and a driver IC 3. A flexible printed circuit (FPC) not illustrated transfers an external signal or driving power that drives the driver IC 3 to the driver IC 3. The display panel 2 includes a light-transmitting insulating substrate such as a glass substrate 11, a display area section 21 provided on the surface of the glass substrate 11 so as to have a large number of pixels each including a liquid crystal cell arranged in a matrix, a horizontal driver (horizontal drive circuit) 23, and a vertical driver (vertical drive circuit) 22. The glass substrate 11 includes a first substrate in which a large number of pixel circuits each including an active element (such as a transistor) are arranged and formed in a matrix, and a second substrate disposed so as to face the first substrate with a predetermined gap. The predetermined gap is maintained between the first substrate and the second substrate with photospacers which are arranged and formed at respective positions on the first substrate. A liquid crystal is enclosed between the first substrate and the second substrate.
System Configuration Example of Display Device The display panel 2 includes, on the glass substrate 11, the display area section 21, the driver IC 3 having the function of an interface (I/F) and a timing generator, the vertical driver 22, and the horizontal driver 23.

The display area section 21 has a matrix structure in which pixels Vpix, each including a liquid crystal layer, arranged in M rows and N columns, each of the pixels Vpix constituting a unit of one pixel to be displayed. In this specification, a row refers to a pixel row having N pixels Vpix arranged in one direction. A column refers to a pixel column having M pixels Vpix arranged in the direction orthogonal to the one direction. Values of M and N are determined in accordance with vertical display resolution and horizontal display resolution. With respect to the arrangement of pixels Vpix with M rows and N columns, scanning lines $24_1, 24_2, 24_3, \ldots 24_M$ are wired for each row, and signal lines $25_1, 25_2, 25_3, \ldots 25_N$ are wired for each column. In the embodiments described below, the scanning lines $24_1, 4_2, 24_3, \ldots 24_M$ may be collectively referred to as scanning lines 24, and the signal lines $25_1, 25_2, 25_3, \ldots 25_N$ may be collectively referred to as signal lines 25. In the embodiments, three arbitrary scanning lines among the scanning lines $24_1, 24_2, 24_3, \ldots 24_M$ are referred to as scanning lines $24_m, 24_{m+1},$ and $24_{m+2}$ (provided that m is a natural number that satisfies m≤M−2), and four arbitrary signal lines among the scanning lines $25_1, 25_2, 25_3, \ldots 25_N$ are referred to as signal lines $25_n, 25_{n+1}, 25_{n+2},$ and $25_{n+3}$ (provided that n is a natural number that satisfies n≤N−3).

External signals including a master clock, a horizontal synchronizing signal, and a vertical synchronizing signal are inputted into the display device 1 from the outside, and these external signals are provided to the driver IC 3. The driver IC 3 performs a level conversion of the master clock, the horizontal synchronizing signal, and the vertical synchronizing signal that have a voltage amplitude of an external power source, thus generating a master clock, a horizontal synchronizing signal, and a vertical synchronizing signal that have a voltage amplitude of an internal power source necessary for driving the liquid crystal. The driver IC 3 provides these generated master clock, horizontal synchronizing signal, and vertical synchronizing signal to the vertical driver 22 and the horizontal driver 23. The driver IC 3 generates a common potential VCOM to be commonly applied to each of the pixels through common electrodes COM prepared for the respective pixels Vpix. The generated common potential VCOM is provided to the display area section 21.

In synchronization with a vertical clock pulse, the vertical driver 22 samples and latches display data outputted from the driver IC 3 in sequence in one horizontal period. The vertical driver 22 sequentially outputs digital data of latched one line as a vertical scanning pulse, and provides the digital data to the scanning lines $24_m, 24_{m+1}, 24_{m+2}, \ldots$ in the display area section 21, so that the pixels Vpix are selected row by row. For example, the vertical driver 22 outputs the digital data to the scanning lines $24_m, 24_{m+1}, 24_{m+2}, \ldots$ in order from the upper side of the display area section 21, i.e., the upper side in a vertical scanning direction, to the lower side of the display area section 21, i.e., the lower side in the vertical scanning direction. The vertical driver 22 may also output the digital data to the scanning lines $24_m, 24_{m+1}, 24_{m+2}, \ldots$ in order from the lower side of the display area section 21, i.e., the lower side in the vertical scanning direction, to the upper side of the display area section 21, i.e., the upper side in the vertical scanning direction.

The horizontal driver 23 receives, for example, 6-bit digital image data Vsig of R (Red), G (Green), and B (Blue). The horizontal driver 23 writes the display data onto each of the pixels Vpix in a row selected by vertical scanning performed by the vertical driver 22. The data write is performed in units of one pixel, in units of a plurality of pixels, or in units of all the pixels through the signal lines 25.

When a same polarity direct current is continuously applied to the liquid crystal, a specific resistance (resistance value specific to a substance) and the like of the liquid crystal may be deteriorated in the display device 1. In order to prevent the specific resistance (resistance value specific to a substance) and the like of the liquid crystal from being deteriorated, the display device 1 adopts a driving system in which the polarity of a picture signal is inverted based on the common potential VCOM of a driving signal in a specified period.

As a driving system of the liquid crystal display panel, systems such as line inversion, dot inversion, and frame inversion driving schemes are known. The line inversion driving system is a system that inverts the polarity of a picture signal in a time period of 1H (H represents a horizontal period) corresponding to one line (one pixel row). The dot inversion driving system is a system that inverts the polarity of the picture signal alternately in units of pixels adjacent to each other in the vertical and horizontal directions. The frame inversion driving system is a system that collectively inverts the polarity of the picture signal to be written onto all the pixels all at once, in units of one frame corresponding to one screen. The display device 1 may adopt any one of the above-described driving systems.

Figure 2:
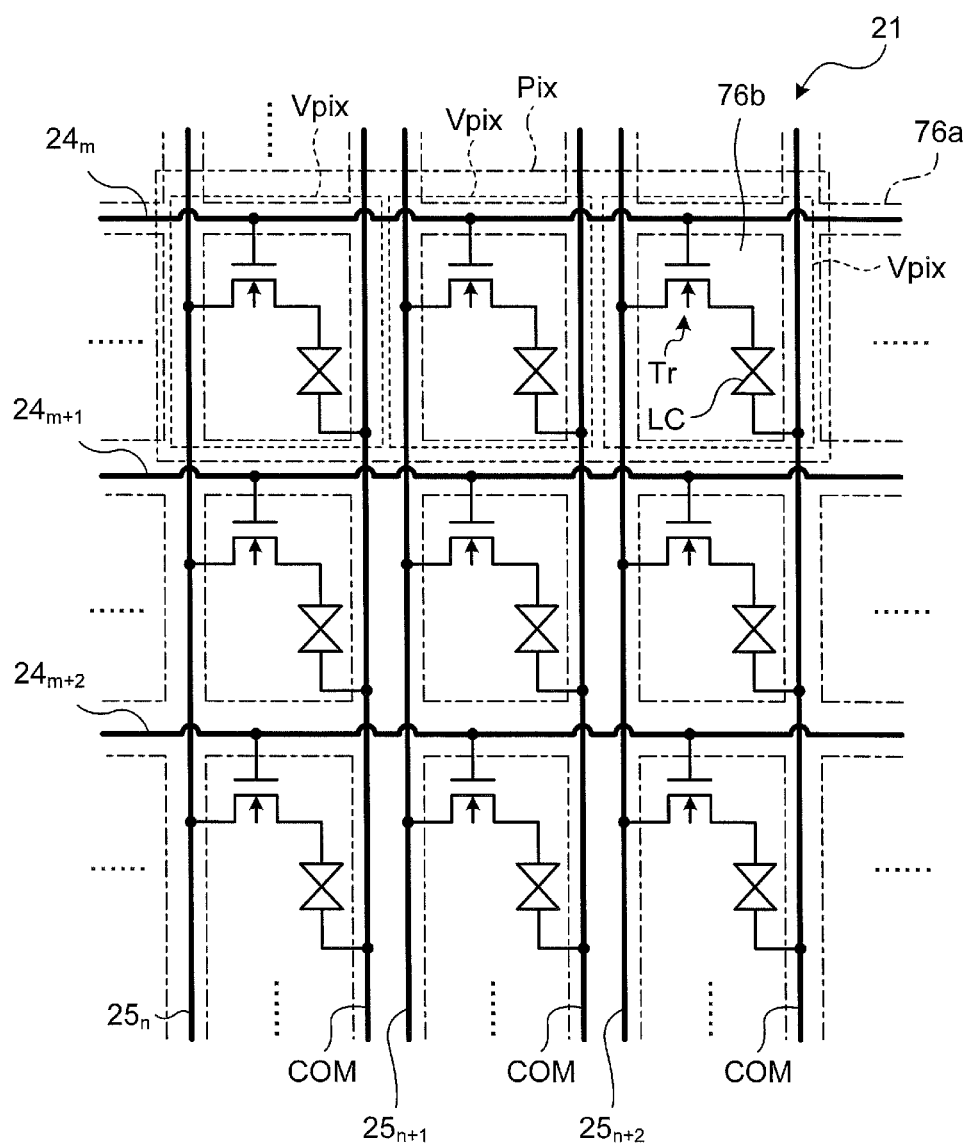
FIG. 2 is a circuit diagram illustrating a drive circuit that drives pixels of the display device according to the first embodiment.

FIG. 2 is a circuit diagram illustrating a drive circuit that drives pixels of the display device according to the first embodiment. The display area section 21 has wiring such as signal lines $25_n$, $25_{n+1}$, and $25_{n+2}$ that supply a pixel signal as display data to a thin-film transistor (TFT) element Tr in each of the pixels Vpix. The display area section 21 also has wiring such as scanning lines $24_m$, $24_{m+1}$, and $24_{m+2}$ that drive each of the TFT elements Tr. Thus, the signal lines $25_n$, $25_{n+1}$, and $25_{n+2}$ are arranged extendedly on a plane parallel to the surface of the aforementioned glass substrate 11 to supply a pixel signal for displaying an image to the pixels Vpix. Each of the pixels Vpix includes a TFT element Tr and a liquid crystal element LC. The TFT element Tr is formed of a thin-film transistor. In this example, the TFT element Tr is formed of an n-channel metal oxide semiconductor (MOS) TFT. One of the source and the drain of the TFT elements Tr is coupled to the signal lines $25_n$, $25_{n+1}$, and $25_{n+2}$. The gate of the TFT elements Tr is coupled to the scanning line $24_m$, $24_{m+1}$, and $24_{m+2}$. The other of the source and the drain of the TFT elements Tr is coupled to one end of the liquid crystal element LC. One end of the liquid crystal element LC is coupled to the other of the source and the drain of the TFT elements Tr, while the other end is coupled to the common electrodes COM.

The pixels Vpix belonging to the same row in the display area section 21 are coupled to each other through the scanning lines $24_m$, $24_{m+1}$, and $24_{m+2}$. The scanning lines $24_m$, $24_{m+1}$, and $24_{m+2}$ are coupled to the vertical driver 22 to receive a vertical scanning pulse Vgate that is a scanning signal supplied from the vertical driver 22. The pixels Vpix belonging to the same column in the display area section 21 are coupled to each other through the signal lines $25_n$, $25_{n+1}$, and $25_{n+2}$. The signal lines $25_n$, $25_{n-1}$, and $25_{n+2}$ are coupled to the horizontal driver 23 to receive a pixel signal supplied from the horizontal driver 23. Further, the pixels Vpix belonging to the same column in the display area section 21 are coupled to each other through the common electrodes COM. The common electrodes COM are coupled to a drive electrode driver not illustrated, and the drive electrode driver supplies a driving signal.

The vertical driver 22 illustrated in FIG. 1 applies a vertical scanning pulse to the gate of the TFT elements Tr in the pixels Vpix via the scanning lines $24_m$, $24_{m+1}$, and $24_{m+2}$ illustrated in FIG. 2. As a result, the vertical driver 22 sequentially selects one row (one horizontal line) at a time of the pixels Vpix formed in a matrix in the display area section 21 as a display driving target. The horizontal driver 23 illustrated in FIG. 1 supplies a pixel signal to each of the pixels Vpix included in one horizontal line sequentially selected by the vertical driver 22 via the signal lines $25_n$, $25_{n+1}$, and $25_{n+2}$ illustrated in FIG. 2. In these pixels Vpix, display of one horizontal line is performed in response to the supplied pixel signal. The drive electrode driver applies a driving signal to drive the common electrodes COM in units of a drive electrode block including a specified number of common electrodes COM.

As described in the foregoing, in the display device 1, the vertical driver 22 drives the scanning lines $24_m$, $24_{m+1}$, and $24_{m+2}$ by sequential scanning to select horizontal lines line by line. Also in the display device 1, the horizontal driver 23 supplies a pixel signal to the pixels Vpix which belong to one horizontal line. As a result, horizontal lines are displayed line by line. When the display operation is performed, the drive electrode driver applies a driving signal to the common electrodes COM corresponding to the one horizontal line.

The display area section 21 has a color filter. The color filter has a lattice-like black matrix 76a and openings 76b. The black matrix 76a is formed so as to cover the outer circumferences of the pixels Vpix as illustrated in FIG. 2. More specifically, the black matrix 76a is disposed in the boundaries between the pixels Vpix which are disposed in a two-dimensional manner. As a result, the black matrix 76a is formed like a lattice. The black matrix 76a is made of a material having a high optical absorptance. The openings 76b are formed by the lattice form of the black matrix 76a. The openings 76b are arranged so as to correspond to the pixels Vpix.

For example, the openings 76b include color regions colored in three colors of red (R), green (G), and blue (B). The color regions of the color filter colored in three colors of, for example, red (R), green (G), and blue (B) are cyclically arranged in the openings 76b. These three color regions of R, G, and B for the respective pixels Vpix are considered as one set, and the one set of the color regions is associated with each of pixels Pix illustrated in FIG. 2.

The color combination of the color filter may be other combinations as long as the color regions are colored in different colors. In the color filter, the luminance in the color region of green (G) is generally higher than the luminance in the color regions of red (R) and blue (B). The color filter may be omitted. If the color filter is omitted, the emission light is white. Alternatively, a light transmissive resin may be used to form a color filter to make the emission light white.

When the display area section 21 is viewed from the direction orthogonal to the front surface, the scanning lines 24 and the signal lines 25 are arranged in the regions overlapping the black matrix 76a of the color filter. In short, the scanning lines 24 and the signal lines 25 are hidden behind the black matrix 76a when they are viewed from the direction orthogonal to the front surface. In the display area section 21, the regions where the black matrix 76a is not disposed serve as the openings 76b.

As illustrated in FIG. 2, the scanning lines $24_m$, $24_{m+1}$, and $24_{m+2}$ are disposed at equal intervals, while the signal lines $25_n$, $25_{n+1}$, and $25_{n+2}$ are also disposed at equal intervals. The respective pixels Vpix are disposed in regions sectioned by the scanning lines $24_m$, $24_{m+1}$, and $24_{m+2}$, and the signal lines $25_n$, $25_{n+1}$, and $25_{n+2}$ in the same orientation.

Figure 3:
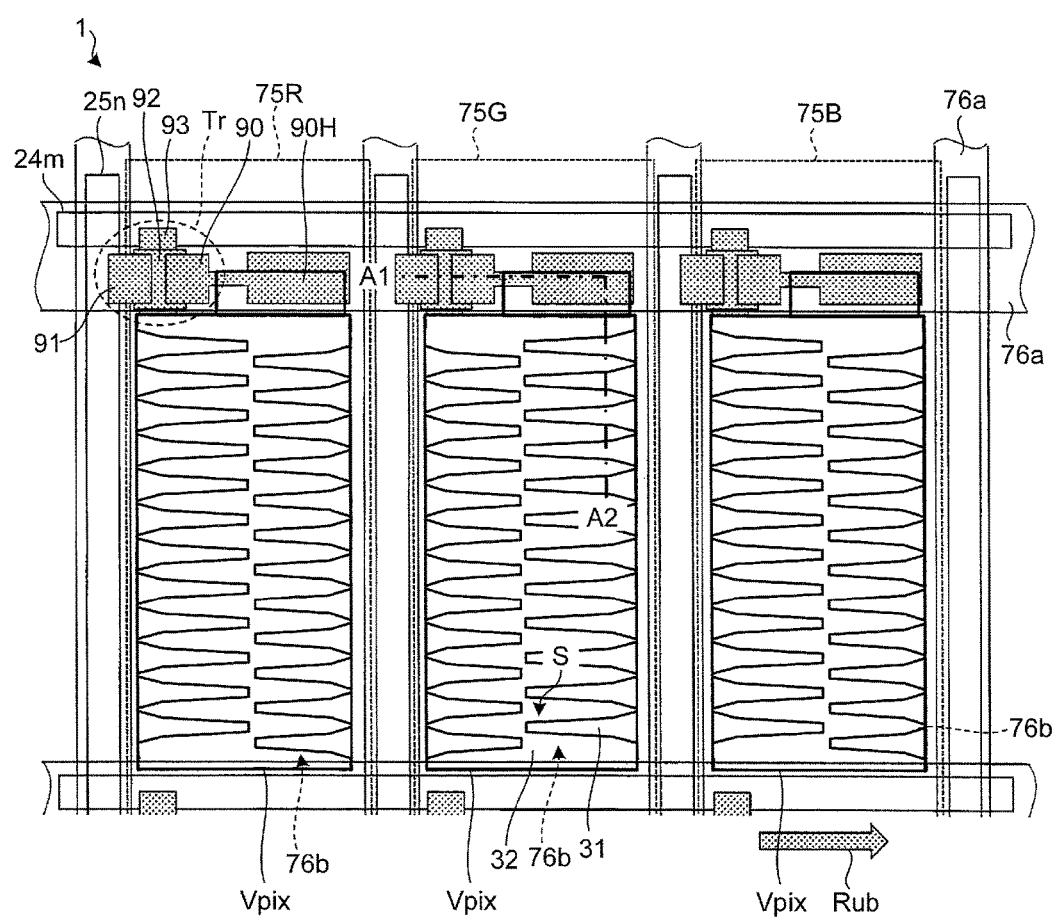
FIG. 3 is a plan view for explaining the pixels of the display device according to the first embodiment.

FIG. 3 is a plan view for explaining the pixels of the display device according to the first embodiment. In each of the pixels Vpix, the openings 76b are formed on the lower side in the vertical scanning direction (in the lower side in FIG. 3). The TFT elements Tr are disposed on a left upper side in the vertical scanning direction (upper side in FIG. 3), and contacts 90H each coupling a drain electrode of the TFT element Tr to a pixel electrode are formed on a right upper side in the vertical scanning direction (upper direction in FIG. 3). The drain of each TFT element Tr includes part of a semiconductor layer (active layer) and a drain electrode 90. Similarly, the source of the TFT element Tr includes another part of the semiconductor layer (active layer) and a source electrode 91. The color filter (including 75R, 75G, and 75B) is configured by cyclically arranging color regions colored in, for example, three colors of red (R), green (G), and blue (B) in the openings 76b, so that the color regions colored in R, G, and B are formed for the corresponding pixels Vpix illustrated in FIG. 2.

Figure 4:
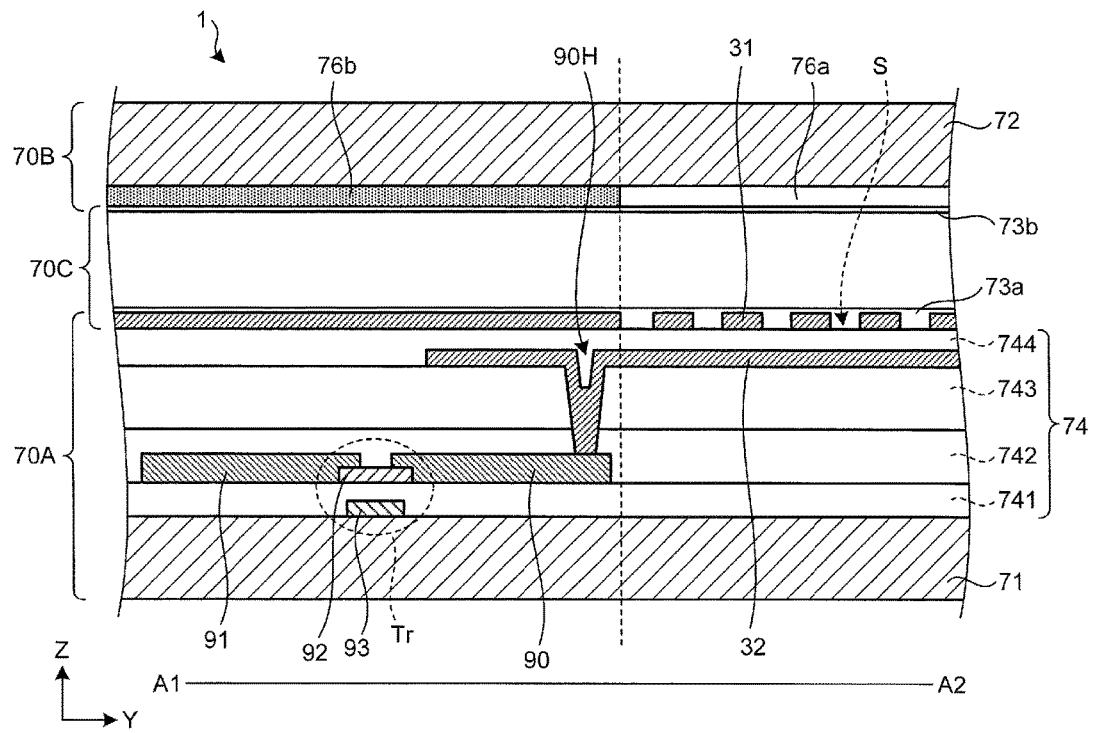
FIG. 4 is a schematic view illustrating a cross section of FIG. 3 taken along line A1-A2.

FIG. 4 is a schematic view illustrating a cross section of FIG. 3 taken along line A1-A2. As illustrated in FIG. 4, the display device 1 includes a pixel substrate (first substrate) 70A, a counter substrate (second substrate) 70B disposed to face the surface of the pixel substrate 70A in a direction perpendicular to the surface of the pixel substrate 70A, and a liquid crystal layer 70C interposed between the pixel substrate 70A and the counter substrate 70B. A backlight (not illustrated) is disposed on the surface of the pixel substrate 70A opposite to the liquid crystal layer 70C. Photospacers (not illustrated) are provided between the pixel substrate 70A and the counter substrate 70B to maintain a predetermined gap therebetween.

In the liquid crystal layer 70C according to the first embodiment, an electric field (transverse electric field) is generated between a first electrode 31 and a second electrode 32 which are laminated in a direction (Z direction) perpendicular to the surface of a TFT substrate 71 of the pixel substrate 70A. Since the electric field is generated in a direction parallel to the TFT substrate 71, the liquid crystal molecules in the liquid crystal layer 70C are caused to rotate in a plane parallel to the substrate surface. Display operation is performed by using the change in optical transmittance in response to the rotation of the liquid crystal molecules. For example, the second electrode 32 illustrated in FIG. 4 corresponds to the aforementioned pixel electrode, and the first electrode 31 corresponds to the aforementioned common electrode COM. As illustrated in FIG. 4A, a first orientation film 73a is provided between the liquid crystal layer 70C and the pixel substrate 70A, and a second orientation film 73b is provided between the liquid crystal layer 70C and the counter substrate 70B.

The counter substrate 70B includes a glass substrate 72 and a light-shielding black matrix 76a formed on one surface of the glass substrate 72. The black matrix 76a faces the liquid crystal layer 70C in a direction perpendicular to the pixel substrate 70A.

The pixel substrate 70A includes a TFT substrate 71 as a circuit board. A scanning lines $24_m$ illustrated in FIG. 3 is formed on the TFT substrate 71. The scanning line $24_m$ is electrically coupled to a gate electrode 93.

A semiconductor layer 92 containing amorphous silicon (a-Si) serving as an active layer of the TFT element Tr is formed above the gate electrode 93. The semiconductor layer 92 is coupled to the source electrode 91 which constitutes the TFT element Tr. The source electrode 91 is an electric conductor which is electrically coupled to part of the semiconductor layer 92. The source electrode 91 is electrically coupled to a signal line $25_n$ illustrated in FIG. 3. The semiconductor layer 92 is coupled to the drain electrode 90 which constitutes the TFT element Tr. The drain electrode 90 is electrically coupled to another part of the semiconductor layer 92.

An insulating layer 74 is formed by laminating, for example, an insulating film 741 between the scanning line $24_m$ and the semiconductor layer 92, an insulating film 742 between the semiconductor layer 92 and the signal line $25_n$, an insulating film 743 between the signal line $25_n$ and the second electrode 32, and an insulating film 744 between the second electrode 32 and the first electrode 31. The insulating films 741 to 744 may be made of an identical insulating material, or any one of them may be made of an insulating material different from the others. For example, the insulating film 743 is made of an organic insulating material such as a polyimide resin, and the other insulating films (the insulating films 741, 742, and 744) are made of an inorganic insulating material such as silicon nitride or oxidized silicon.

The contact 90H made of a conductive metal is formed in a so-called contact hole so as to couple the drain electrode 90 and the second electrode 32. As the common electrode COM, the first electrode receives a common potential VCOM which is commonly provided to the respective pixels. The second electrode 32 is a light-transmitting electrode made of a light-transmitting conductive material (light-transmitting conductive oxide) such as indium tin oxide (ITO).

Figure 5:
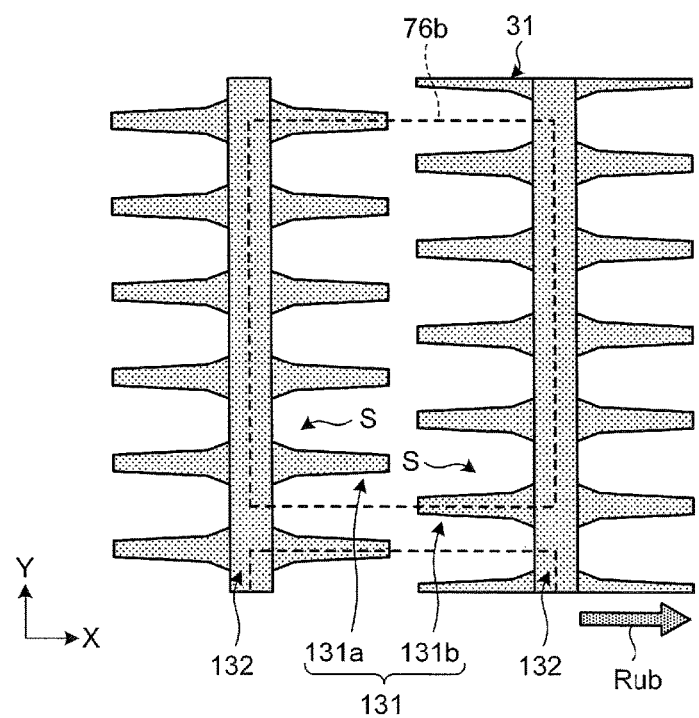
FIG. 5 is a schematic view for explaining the relationship between the shape of a first electrode and an opening according to the first embodiment.

FIG. 5 is a schematic view for explaining the relationship between the shape of the first electrode and an opening according to the first embodiment. As illustrated in FIG. 5, the first electrode 31 is formed like teeth of a comb due to the presence of slits S that are regions without the conductive material. The first electrode 31 includes a plurality of comb tooth portions 131 protruding from an electrode base 132 extending in a Y direction. The comb tooth portions 131 include comb tooth portions 131a and comb tooth portions 131b which extend from the electrode base 132 in directions opposite to each other. The plurality of adjacent comb tooth portions 131a protrude from the electrode base 132 at constant intervals. Similarly, the plurality of adjacent comb tooth portions 131b protrude from the electrode base 132 at constant intervals. From one electrode base 132, the comb tooth portions 131a extend in an X direction and the comb tooth portions 131b extend also in the X direction but are directed in a direction opposite to the direction of the comb tooth portions 131a.

Rubbing Direction

A rubbing treatment is applied to the first orientation film 73a in a rubbing direction Rub (first rubbing direction) illustrated in FIGS. 3 and 5 so that the first orientation film 73a has a predetermined initial orientation in the X direction. The rubbing treatment is applied to the second orientation film 73b in a direction (second rubbing direction) antiparallel to the rubbing direction Rub of the first orientation film 73a. The rubbing directions of the first orientation film 73a and the second orientation film 73b are in a relation antiparallel to each other. As described in the foregoing, the comb tooth portions 131a extend in the X direction, and the comb tooth portions 131b extend also in the X direction but are directed in a direction opposite to the direction of the comb tooth portions 131a. The rubbing direction Rub is parallel to the direction in which the comb tooth portions 131a or the comb tooth portions 131b extend. The term "parallel" used herein means that the rubbing direction Rub is parallel enough to maintain the rotation directions LCQ of later-described liquid crystal molecules illustrated in FIG. 9. More specifically, a manufacture error of 0 to 0.5 degrees is included.

It should be noted that in the present embodiment, the rubbing treatment has been described as an orientation treatment for imparting initial orientation to the liquid crystal molecules of the liquid crystal layer 70C; however, the present disclosure is not limited thereto. As the orientation treatment, photo alignment treatment may be used instead of the rubbing treatment. The photo alignment treatment involves irradiation of polymer film with light such as linearly polarized ultraviolet light. The irradiation induces selective reaction of polymer chains in a polarization direction, which generates anisotropy so as to provide liquid crystal molecular orientation. In the case of performing the photo alignment treatment, photo-alignment films may be used as the first orientation film 73a and the second orientation film 73b.

Light Shielding Portion

Figure 6:
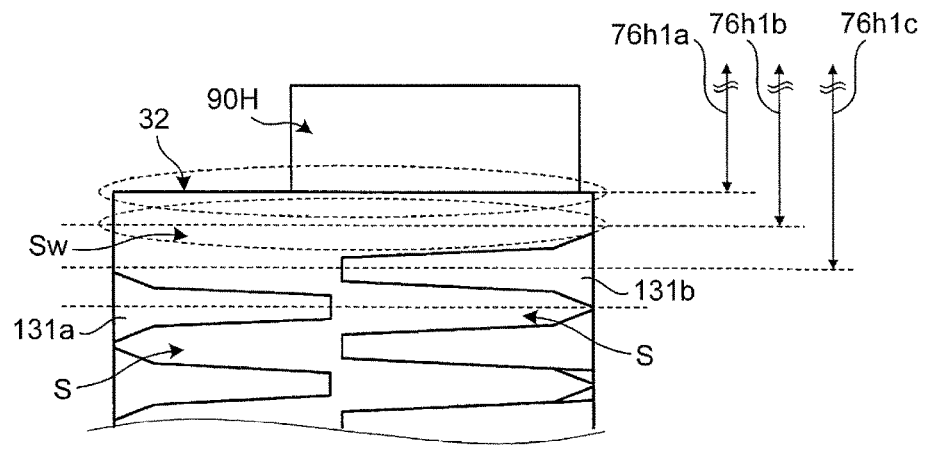
FIG. 6 is a schematic view for explaining the relationship between the shape of the first electrode and a light shielding portion according to the first embodiment.

FIG. 6 is a schematic view for explaining the relationship between the shape of the first electrode and a light shielding portion according to the first embodiment. The black matrix 76a is required to shield light up to the position of a width 76h1a illustrated in FIG. 6 to hide the contact 90H. An electric field applied to an endmost slit Sw between a comb tooth portion 131b close to the edge of the opening 76b and the contact 90H is different in distribution from an electric field applied to the slits S formed between the adjacent comb tooth portions 131a or between the adjacent comb tooth portions 131b. Accordingly, the black matrix 76a shields light at least up to the position of a width 76h1b illustrated in FIG. 6 to hide the contact 90H and half or more of the endmost slit Sw. This makes it possible to approximate the change rate of transmittance in the endmost slit Sw to that in the slits S. If the black matrix 76a shields light up to the position of a width 76h1c illustrated in FIG. 6 to hide the contact 90H and the endmost slit Sw, it becomes unnecessary to take into consideration the difference between the change rates of transmittance in the endmost slit Sw and the slits S. With this configuration, the luminance in the openings 76b can be made uniform.

Examples of liquid crystals may include a positive-type liquid crystal (liquid crystal with positive dielectric anisotropy) and a negative-type liquid crystal (liquid crystal with negative dielectric anisotropy). A description will now be given of a case of the positive-type liquid crystal and a case of the negative-type liquid crystal.

Figure 7:
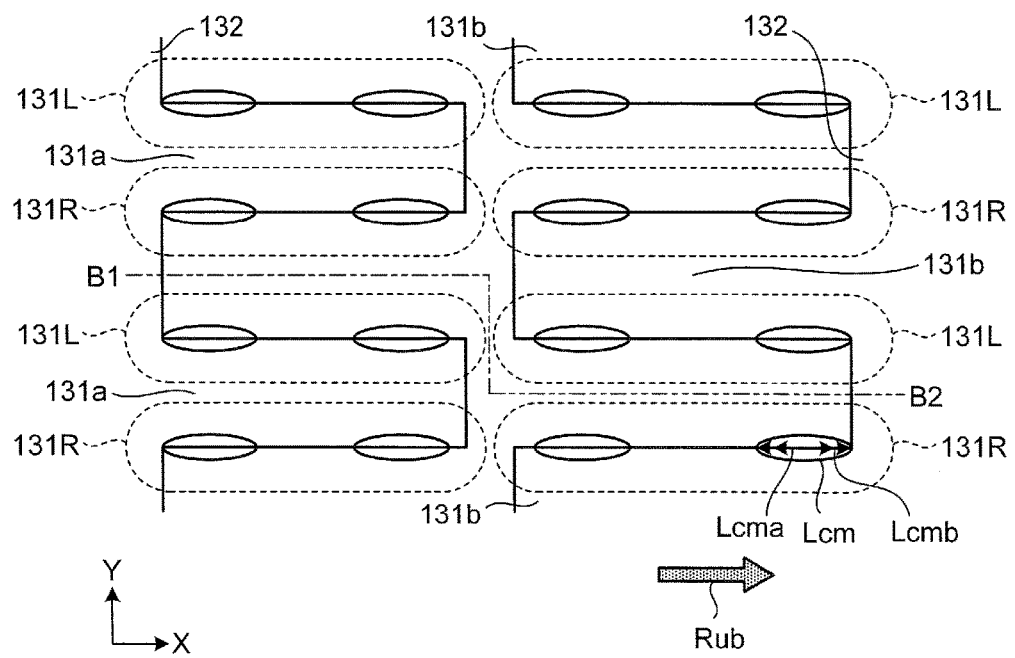
FIG. 7 is an explanatory view for explaining liquid crystal molecular orientation in the display device according to the first embodiment, when a positive-type liquid crystal is used and a voltage for forming an electric field is not applied between the first electrode and the second electrode.
Figure 8:
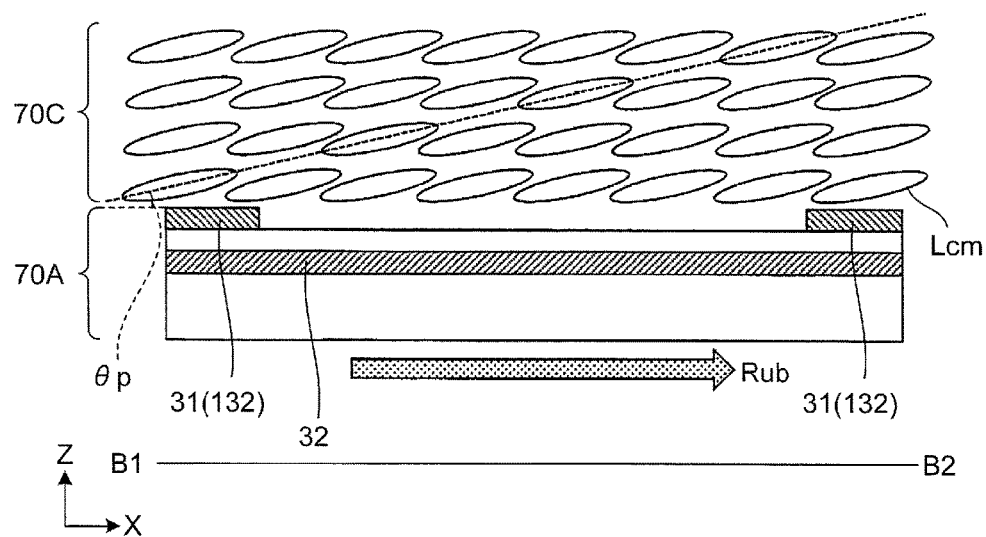
FIG. 8 is a schematic view illustrating a cross section of FIG. 7 taken along line B1-B2.
Figure 9:
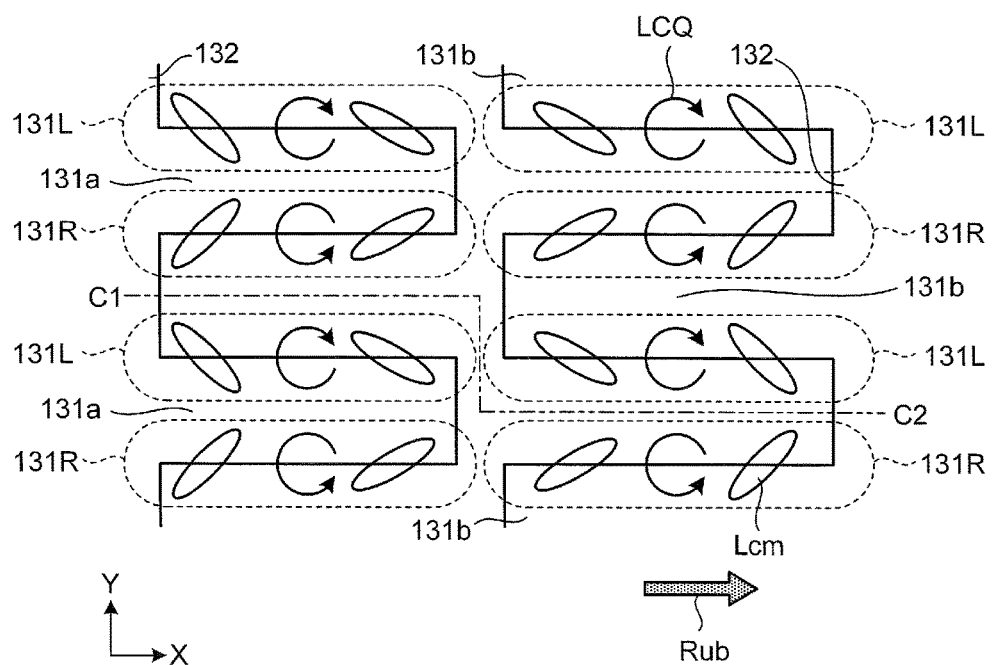
FIG. 9 is an explanatory view for explaining liquid crystal molecular orientation in the display device according to the first embodiment, when a positive-type liquid crystal is used and a voltage for forming an electric field is applied between the first electrode and the second electrode.
Figure 10:
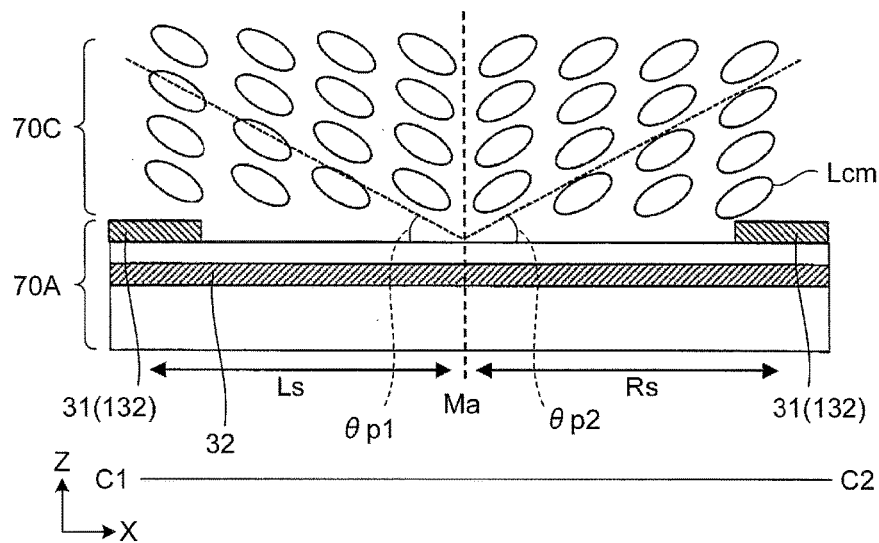
FIG. 10 is a schematic view illustrating a cross section of FIG. 9 taken along line C1-C2.
Figure 11:
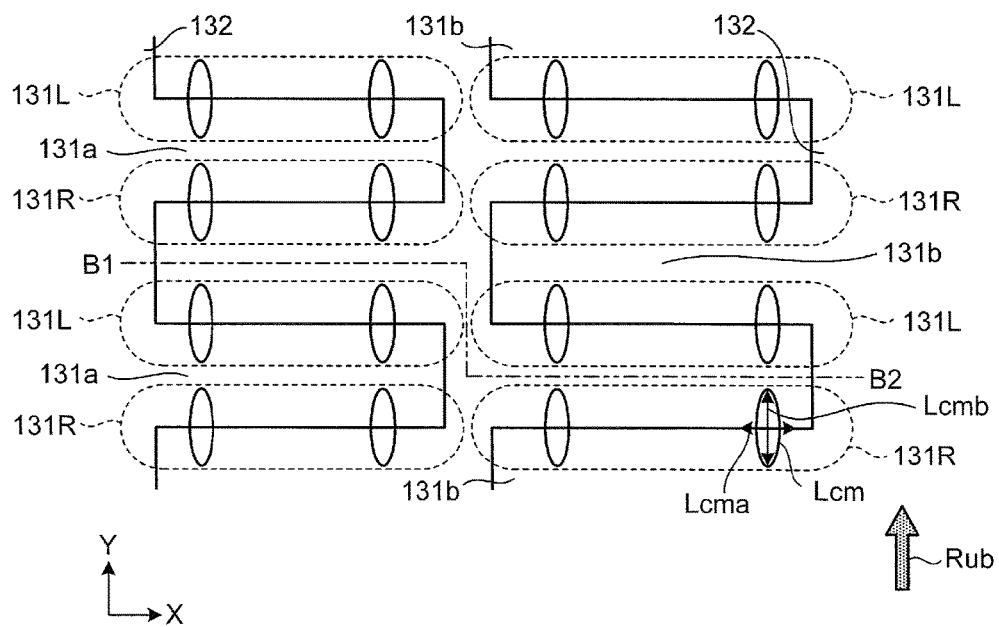
FIG. 11 is an explanatory view for explaining liquid crystal molecular orientation in the display device according to the first embodiment, when a negative-type liquid crystal is used and a voltage for forming an electric field is not applied between the first electrode and the second electrode.
Figure 12:
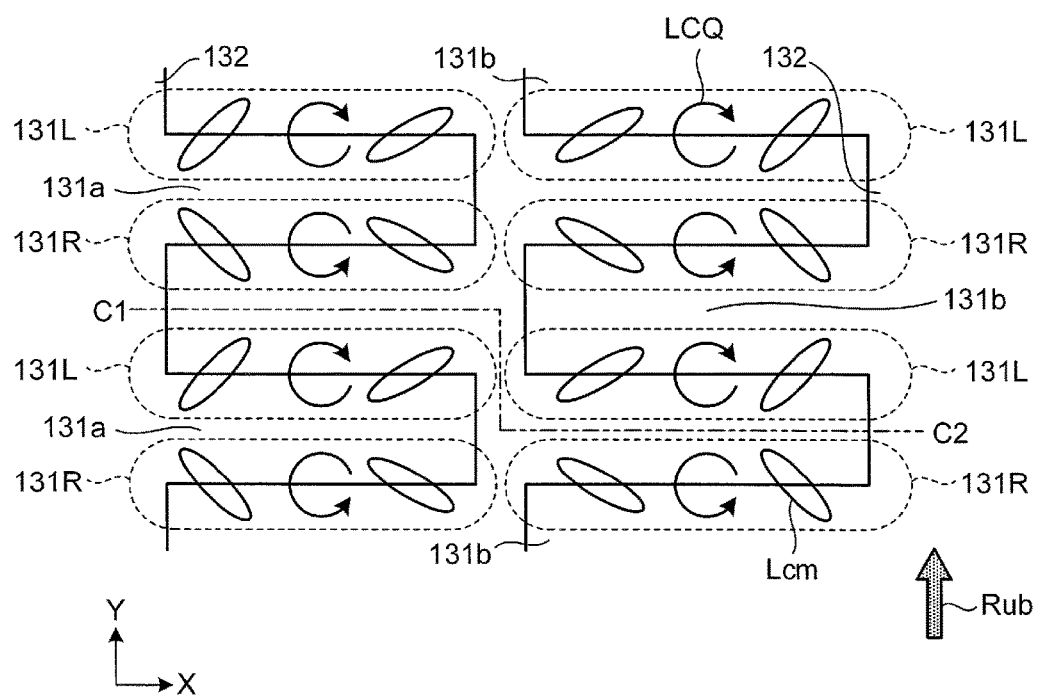
FIG. 12 is an explanatory view for explaining liquid crystal molecular orientation in the display device according to the first embodiment, when a negative-type liquid crystal is used and a voltage for forming an electric field is applied between the first electrode and the second electrode.
Figure 13:
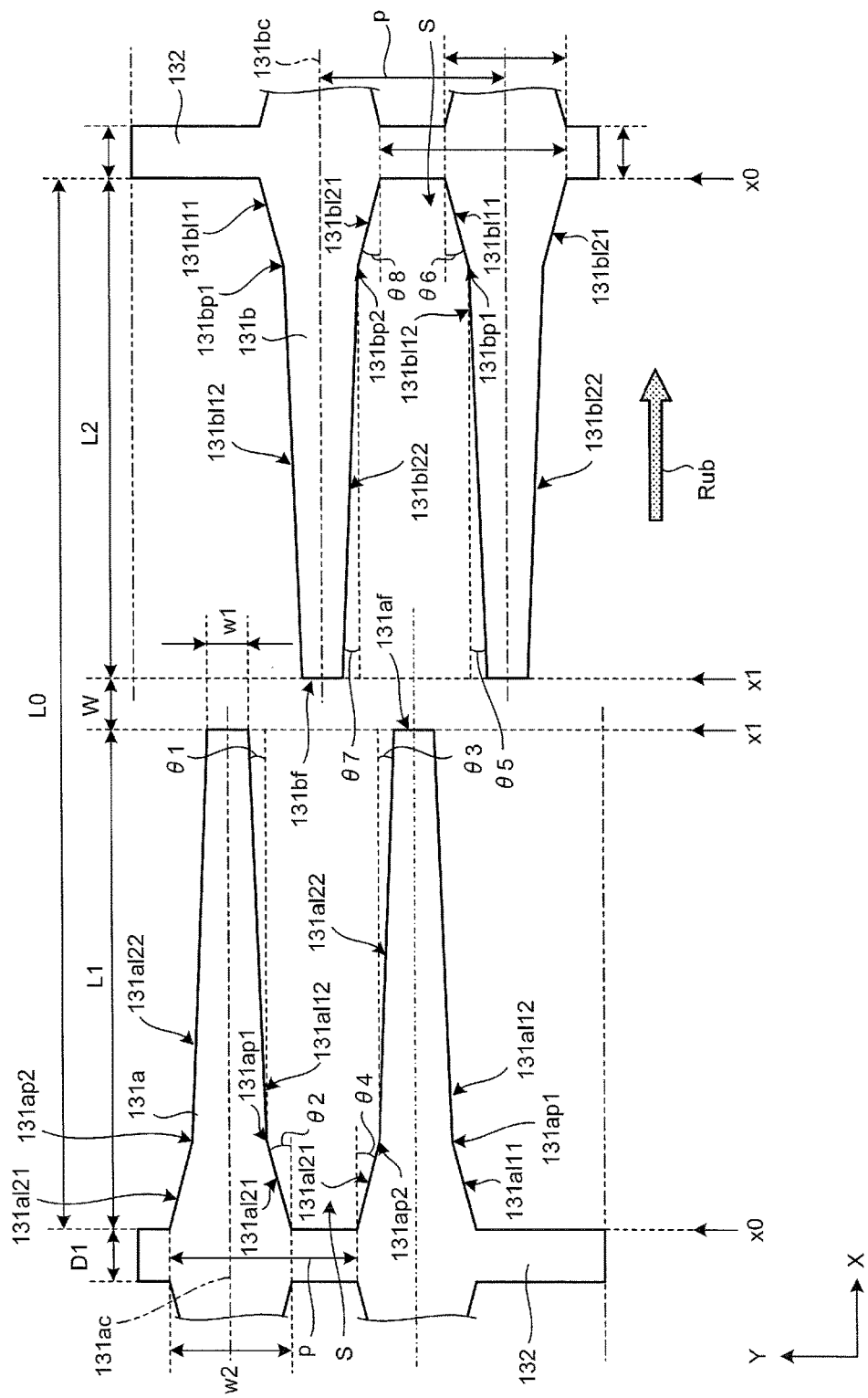
FIG. 13 is a schematic view for explaining the shape of the first electrode according to the first embodiment in detail.

FIG. 7 is an explanatory view for explaining liquid crystal molecular orientation in the display device according to the first embodiment, when a positive-type liquid crystal is used and a voltage for forming an electric field is not applied between the first electrode and the second electrode. FIG. 8 is a schematic view illustrating a cross section of FIG. 7 taken along line B1-B2. FIG. 9 is an explanatory view for explaining liquid crystal molecular orientation in the display device according to the first embodiment, when a positive-type liquid crystal is used and a voltage for forming an electric field is applied between the first electrode and the second electrode. FIG. 10 is a schematic view illustrating a cross section of FIG. 9 taken along line C1-C2. FIG. 11 is an explanatory view for explaining liquid crystal molecular orientation in the display device according to the first embodiment, when a negative-type liquid crystal is used and a voltage for forming an electric field is not applied between the first electrode and the second electrode. FIG. 12 is an explanatory view for explaining liquid crystal molecular orientation in the display device according to the first embodiment, when a negative-type liquid crystal is used and a voltage for forming an electric field is applied between the first electrode and the second electrode. FIG. 13 is a schematic view for explaining the shape of the first electrode according to the first embodiment in detail.

In the positive-type liquid crystal (liquid crystal with positive dielectric anisotropy), a dielectric anisotropy direction Lcma and a refractive index anisotropy Lcmb of liquid crystal molecules Lcm extend along a major axis direction of the liquid crystal molecules Lcm as illustrated in FIG. 7.

As described in the foregoing, the rubbing treatment is applied to the first orientation film 73a in the rubbing direction Rub illustrated in FIGS. 3 and 5 so that the first orientation film 73a has a predetermined initial orientation in the X direction. Accordingly, as illustrated in FIG. 7, when a voltage for forming an electric field is not applied between the first electrode 31 and the second electrode 32, the major axis direction of the liquid crystal molecules Lcm in the liquid crystal layer 70C tend to extend and align in parallel with the direction in which the comb tooth portions 131a and 131b extend. Accordingly, in a vicinity of a right long side 131R and a left long side 131L of the comb tooth portions which face each other in a width direction of the slits S, the liquid crystal molecules Lcm are initially oriented in parallel with the direction in which the comb tooth portions 131a and the comb tooth portions 131b extend. The liquid crystal molecules Lcm illustrated in FIG. 8 extend along the rubbing direction Rub, and are also initially oriented upward to have a pre-tilt angle θp with respect to the surface of the TFT substrate 71 along the rubbing direction Rub.

As illustrated in FIG. 9, when a voltage for forming an electric field is applied between the first electrode 31 and the second electrode 32, the liquid crystal molecules Lcm rotate in liquid crystal rotation directions LCQ. More specifically, the liquid crystal rotation directions LCQ represent directions of twist or rotation of the liquid crystal on an X-Y plane. The liquid crystal molecules Lcm in the vicinity of the right long side 131R and in the vicinity of the left long side 131L tend to rotate in respective directions opposite to each other due to the influence of electric fields opposite in direction from each other.

Thus, in the liquid crystal layer 70C of the display device 1 according to the first embodiment, when a voltage is applied to the first electrode 31 and the second electrode 32, the liquid crystal molecules in the vicinity of the right long side 131R, which is one of facing sides of the comb tooth portions 131a (131b) adjacent in a width direction of the slits S, rotate in the direction opposite to the rotation direction of the liquid crystal molecules in the vicinity of the left long side 131L which is the other of the facing sides of the adjacent comb tooth portions 131a (131b). Accordingly, as compared with the FFS-mode display device disclosed in JP-A-2008-52161, the display device according to the first embodiment is configured so that the liquid crystal molecules Lcm react to changes in the electric fields between the first electrode 31 and the second electrode 32 at high speed. This improves the response speed of the display device 1 according to the first embodiment.

The response speed herein refers to a speed at which the transmittance of the liquid crystal is shifted between specified levels when a voltage is applied to the first electrode 31 and the second electrode 32. More specifically, the response speed is specified by the time required to shift from the state where a voltage is not applied (for example, transmittance=0) to the state where a voltage is applied (transmittance=1) or vice versa.

When the voltage for forming an electric field is applied between the first electrode 31 and the second electrode 32, the major axis direction of the liquid crystal molecules Lcm changes in Z direction, while rotating in a plane (X-Y plane) parallel to the surface of the pixel substrate 70A (TFT substrate 71) as illustrated in FIG. 10. Since the first electrode 31 and the second electrode 32 are disposed so as to face each other in the direction perpendicular to the surface of the pixel substrate 70A (TFT substrate 71), the electric field formed between the first electrode 31 and the second electrode 32 turns into a fringing field which passes the slits S. Due to the fringing field, the major axes of the liquid crystal molecules Lcm rise in the direction (Z direction) perpendicular to the surface of the pixel substrate 70A (TFT substrate 71), while rotating in the respective liquid crystal rotation directions LCQ (clockwise, counterclockwise) on the X-Y plane illustrated in FIG. 9. In a center region of the slit S, the liquid crystal rotation directions LCQ may be intermingled.

As illustrated in FIG. 10, in a slit region Rs between the comb tooth portions 131b, the major axis direction of the liquid crystal molecules Lcm forms an angle θp2 which is larger than the pre-tilt angle θp. In a slit region Ls between the comb tooth portions 131a, the major axis direction of the liquid crystal molecules Lcm forms an angle θp1 which is in a direction opposite to the pre-tilt angle θp. The major axis direction of the liquid crystal molecules Lcm in the slit region Ls may have more difficulty in rising and have lower responsiveness than the major axis direction of the liquid crystal molecules Lcm in the slit region Rs.

In the negative-type liquid crystal (liquid crystal with negative dielectric anisotropy), the dielectric anisotropy direction Lcma of liquid crystal molecules Lcm extends along a minor axis direction of the liquid crystal molecules Lcm, while the refractive index anisotropy Lcmb extend along the major axis direction of the liquid crystal molecules Lcm as illustrated in FIG. 11.

As described in the foregoing, the rubbing treatment is applied to the first orientation film 73a in the rubbing direction Rub illustrated in FIGS. 3 and 5 so that the first orientation film 73a has a predetermined initial orientation in the Y direction. Accordingly, as illustrated in FIG. 11, when a voltage for forming an electric field is not applied between the first electrode 31 and the second electrode 32, the major axis direction of the liquid crystal molecules Lcm in the liquid crystal layer 70C tend to extend and align at right angles to the direction in which the comb tooth portions 131a and the comb tooth portions 131b extend. Accordingly, in the vicinity of the right long side 131R and the left long side 131L of the comb tooth portions which face each other in the width direction of the slits S, the liquid crystal molecules Lcm are initially oriented at right angles to the direction in which the comb tooth portions 131a and the comb tooth portions 131b extend. The liquid crystal molecules Lcm extend at right angles to the rubbing direction Rub, and are also initially oriented upward to have a pre-tilt angle θp with respect to the surface of the TFT substrate 71 at right angles to the rubbing direction Rub.

As illustrated in FIG. 12, when a voltage for forming an electric field is applied between the first electrode 31 and the second electrode 32, the liquid crystal molecules Lcm rotate in the liquid crystal rotation directions LCQ. More specifically, the liquid crystal rotation directions LCQ represent the directions of twist or rotation of the liquid crystal on the X-Y plane. The liquid crystal molecules Lcm in the vicinity of the right long side 131R and in the vicinity of the left long side 131L tend to rotate in respective directions opposite to each other due to the influence of electric fields opposite in direction from each other.

Thus, in the liquid crystal layer 70C of the display device 1 according to the first embodiment, when a voltage is applied to the first electrode 31 and the second electrode 32, the liquid crystal molecules in the vicinity of the right long side 131R, which is one of facing sides of the comb tooth portions 131a (131b) adjacent in the width direction of the slits S, rotate in the direction opposite to the rotation direction of the liquid crystal molecules in the vicinity of the left long side 131L which is the other of the facing sides of the adjacent comb tooth portions 131a (131b). Accordingly, as compared with the FFS-mode display device disclosed in JP-A-2008-52161, the display device 1 according to the first embodiment is configured so that the liquid crystal molecules Lcm react to changes in electric fields between the first electrode 31 and the second electrode 32 at high speed. This improves the response speed of the display device 1 according to the first embodiment.

When the voltage for forming an electric field is applied between the first electrode 31 and the second electrode 32, the major axis direction of the liquid crystal molecules Lcm changes in the Z direction, while rotating in the plane (X-Y plane) parallel to the surface of the pixel substrate 70A (TFT substrate 71). Since the first electrode 31 and the second electrode 32 are disposed so as to face each other in the direction perpendicular to the surface of the pixel substrate 70A (TFT substrate 71), the electric field formed between the first electrode 31 and the second electrode 32 turns into a fringing field which passes the slits S. Due to the fringing field, the major axes of the liquid crystal molecules Lcm rise in the direction (Z direction) perpendicular to the surface of the pixel substrate 70A (TFT substrate 71), while rotating in the respective liquid crystal rotation directions LCQ (clockwise, counterclockwise) on the X-Y plane illustrated in FIG. 12. In the center region of the slit S, the liquid crystal rotation directions LCQ may be intermingled.

As illustrated in FIG. 13, the display device 1 according to the first embodiment can improve responsiveness and orientation stability by specifying the details of the shape of the first electrode 31. For example, as illustrated in FIG. 13, a total slit length between the electrode bases 132 in the X direction is represented by L0. A comb tooth protruding length of the comb tooth portions 131a in the X direction is represented by L1. The comb tooth protruding length L1 is a length from a position x1 at a distal end 131af of the comb tooth portion 131a to a protruding starting position x0 of the electrode base 132. Similarly, a comb tooth protruding length of the comb tooth portions 131b in the X direction is represented by L2. The comb tooth protruding length L2 is a length from a position x1 at a distal end 131bf of the comb tooth portion 131b to a protruding starting position x0 of the electrode base 132. A width of the distal end 131af of the comb tooth portion 131a and the distal end 131bf of the comb tooth portion 131b in the Y direction is represented by w1. For example, the total slit length L0 is preferably 10 μm to 60 μm. The total slit length L0 is preferably less than 40 μm, namely 20 μm for example. In the display device 1 according to the first embodiment, the orientation stability of the liquid crystal becomes higher with a shorter total slit length L0, whereas the luminance becomes higher with a longer total slit length L0.

As described in the foregoing, the major axis direction of the liquid crystal molecules Lcm in the slit region Ls illustrated in FIG. 10 may have more difficulty in rising and have lower responsiveness than the major axis direction of the liquid crystal molecules Lcm in the slit region Rs. In order to make the slit region Ls smaller than the slit region Rs, the comb tooth protruding length L1 illustrated in FIG. 13 is made smaller than the comb tooth protruding length L2 of the comb tooth portion 131b which is downstream of the comb tooth portion 131a in the rubbing direction Rub. As a consequence, the display device 1 according to the first embodiment can improve the response speed.

The width w1 of the distal end 131*af* of the comb tooth portion 131*a* and the distal end 131*bf* of the comb tooth portion 131*b* in the Y direction may be set at, for example, 2 µm to 5 µm. The response speed can become higher with a smaller width w1.

An array pitch p of the adjacent comb tooth portions 131*a* is identical to an array pitch of the adjacent comb tooth portions 131*b*. The distal end 131*af* of the comb tooth portion 131*a* and the distal end 131*bf* of the comb tooth portion 131*b* are alternately arranged in the Y direction. According to this configuration, the right long side 131R of the comb tooth portion 131*a* and the right long side 131R of the comb tooth portion 131*b* are aligned in the X direction as illustrated in FIG. 9. According to this configuration, the left long side 131L of the comb tooth portion 131*a* and the left long side 131L of the comb tooth portion 131*b* are also aligned in the X direction as illustrated in FIG. 9. As a result, the liquid crystal rotation directions LCQ in which the liquid crystal molecules Lcm rotate are identical as viewed in the X direction, so that rotating behavior of the liquid crystal molecules Lcm is stabilized. Since a smaller array pitch p leads to a higher response speed, it is preferable to set the array pitch p to be smaller than 9 µm.

A space between the distal end 131*af* of the comb tooth portion 131*a* and the distal end 131*bf* of the comb tooth portion 131*b* illustrated in FIG. 13 forms a communicating opening portion extending into a vertical slit, and a width W thereof in the X-direction is preferably smaller. For example, the width W of the communicating opening portion in the X direction is 7 µm or less. The width W of the communicating opening portion in the X direction is more preferably 4 µm or less.

At the protruding starting position x0 of the electrode base 132, the comb tooth portion 131*a* has a width w2 in the Y direction, which is larger than the width w1 of the distal end 131*af* of the comb tooth portion 131*a* in the Y direction. The right long side of the comb tooth portion 131*a* is made up of a part 131*a*/11 on the electrode base 132 side (hereinafter referred to as "base side") and a part 131*a*/12 on a distal end side (hereinafter referred to as "distal end side") of the comb tooth portion 131*a* with a point 131*ap*1 as a bending point. The part 131*a*/11 forms an oblique side that inclines by an angle θ2 with respect to an imaginary line 131*ac* (X direction in which the comb tooth portion 131*a* extends) passing through the center of the comb tooth portion 131*a*. The part 131*a*/12 is an oblique side that inclines by an angle θ1 with respect to the imaginary line 131*ac*. The angle θ1 and the angle θ2 are in a relation of θ1<θ2.

The angles θ1 and θ2 have characteristics that (A) smaller angles cause lower stability in liquid crystal molecular orientation, whereas larger angles cause higher stability in liquid crystal molecular orientation. If the angles θ1 and θ2 are larger than 0.5 degrees, the liquid crystal rotation directions LCQ in which the liquid crystal molecules Lcm rotate tend to align and the behavior of the liquid crystal molecules Lcm is stabilized. The angles θ1 and θ2 have characteristics that (B) smaller angles cause higher optical transmittance, whereas larger angles cause lower optical transmittance. In short, smaller θ1 and θ2 have both a merit and a demerit, while larger θ1 and θ2 also have both a merit and a demerit. Accordingly, the display device 1 balances the above-described merit and the demerit by setting the angles of the base-side part 131*a*/11 and the distal end-side part 131*a*/12 of the right long side of the comb tooth portion 131*a* with respect to the imaginary line 131*ac* to be different from each other. In short, in the display device 1, the angle θ2 between the base-side part 131*a*/11, which is low in contribution to optical transmittance, and the imaginary line 131*ac* is made larger to regulate the liquid crystal molecular orientation and to trigger the liquid crystal rotation, so that the stability in liquid crystal molecular orientation is improved. At the same time, in the display device 1, the angle θ1 between the distal end-side part 131*a*/12 and the imaginary line 131*ac* is made smaller, so that the optical transmittance is improved. As a consequence, the display device 1 can harmonize the improvement in stability of liquid crystal molecular orientation and improvement in optical transmittance.

Although the right long side of the comb tooth portion 131*a* has one bending point 131*ap*1 in this embodiment, the right long side may have two or more bending points. As described later, the right long side of the comb tooth portion 131*a* may have no bending point but have a continuously varied shape (like a curve).

Similarly, the left long side of the comb tooth portion 131*a* is made up of a base-side part 131*a*/21 and a distal end-side part 131*a*/22 with a point 131*ap*2 as a bending point. The part 131*a*/21 forms an oblique side that inclines by an angle θ4 with respect to the imaginary line 131*ac*. The part 131*a*/22 forms an oblique side that inclines by an angle θ3 with respect to the imaginary line 131*ac*. The angle θ3 and the angle θ4 are in a relation of θ3<θ4. In the display device 1, the angle θ4 between the base-side part 131*a*/21, which is low in contribution to optical transmittance, and the imaginary line 131*ac* is made larger to regulate the liquid crystal molecular orientation and to trigger the liquid crystal rotation, so that the stability in liquid crystal molecular orientation is improved. At the same time, in the display device 1, the angle θ3 between the distal end-side part 131*a*/22 and the imaginary line 131*ac* is made smaller, so that the optical transmittance is improved. As a consequence, the display device 1 can harmonize the improvement in stability of liquid crystal molecular orientation and improvement in optical transmittance.

Although the left long side of the comb tooth portion 131*a* has one bending point 131*ap*2 in this embodiment, the left long side may have two or more bending points. As described later, the left long side of the comb tooth portion 131*a* may have no bending point but have a continuously varied shape (like a curve).

Similarly, at the protruding starting position x0 of the electrode base 132, the comb tooth portion 131*b* has a width w2 in the Y direction, which is larger than the width w1 of the distal end 131*bf* of the comb tooth portion 131*b* in the Y direction. Further, the right long side of the comb tooth portion 131*b* is made up of a base-side part 131*b*/11 and a distal end-side part 131*b*/12 with a point 131*bp*1 as a bending point. The part 131*b*/11 forms an oblique side that inclines by an angle θ6 with respect to the imaginary line 131*ac*. The part 131*b*/12 is an oblique side that inclines by an angle θ5 with respect to the imaginary line 131*ac*. The angle θ5 and the angle θ6 are in a relation of θ5<θ6. In the display device 1, the angle θ6 between the base-side part 131*b*/11, which is low in contribution to optical transmittance, and the imaginary line 131*ac* is made larger to regulate the liquid crystal molecular orientation and to trigger the liquid crystal rotation, so that the stability in liquid crystal molecular orientation is improved. At the same time, in the display device 1, the angle θ5 between the distal end-side part 131*b*/12 and the imaginary line 131*ac* is made smaller, so that the optical transmittance is improved. As a consequence, the display device 1 can harmonize the improvement in stability of liquid crystal molecular orientation and improvement in optical transmittance.

Although the right long side of the comb tooth portion 131b has one bending point 131bp1 in this embodiment, the right long side may have two or more bending points. As described later, the right long side of the comb tooth portion 131b may have no bending point but have a continuously varied shape (like a curve).

Similarly, the left long side of the comb tooth portion 131b is made up of a base-side part 131bl21 and a distal end-side part 131bl22 with a point 131bp2 as a bending point. The part 131bl21 forms an oblique side that inclines by an angle θ8 with respect to the imaginary line 131ac. The part 131bl22 forms an oblique side that inclines by an angle θ7 with respect to the imaginary line 131ac. The angle θ7 and the angle θ8 are in a relation of θ7<θ8. In the display device 1, the angle θ8 between the base-side part 131bl21, which is low in contribution to optical transmittance, and the imaginary line 131ac is made larger to regulate the liquid crystal molecular orientation and to trigger the liquid crystal rotation, so that the stability in liquid crystal molecular orientation is improved. At the same time, in the display device 1, the angle θ7 between the distal end-side part 131bl22 and the imaginary line 131ac is made smaller, so that the optical transmittance is improved. As a consequence, the display device 1 can harmonize the improvement in stability of liquid crystal molecular orientation and improvement in optical transmittance.

Although the left long side of the comb tooth portion 131b has one bending point 131bp2 in this embodiment, the left long side may have two or more bending points. As described later, the left long side of the comb tooth portion 131b may have no bending point but have a continuously varied shape (like a curve).

Thus, the display device 1 according to the first embodiment is configured so that the liquid crystal rotation directions are aligned among the columns adjacent in the X direction and on the lines in the X-direction, so that high orientation stability is achieved.

Since the electrode base 132 does not contribute to the light transmission, a width D1 of the electrode base 132 in the X direction (the direction orthogonal to the direction in which the electrode base 132 extends) is preferably small. However, the plurality of comb tooth portions 131a or the plurality of comb tooth portions 131b protrude from one side or both the sides of the electrode base 132. Accordingly, when the electrode base 132 is formed concurrently with the comb tooth portions 131a or the comb tooth portions 131b, the width D1 of the electrode base 132 in the X direction tends to be larger than the width w2 due to surroundingly sneaking of exposure light. Particularly when the electrode base 132 is formed as a light-transmitting electrode made of a light-transmitting conductive material (light-transmitting conductive oxide) such as indium tin oxide (ITO), like the comb tooth portions 131a or the comb tooth portions 131b, the width D1 of the electrode base 132 in the X direction tends to be larger than the width w2 due to infiltration of exposure light.

Figure 14:
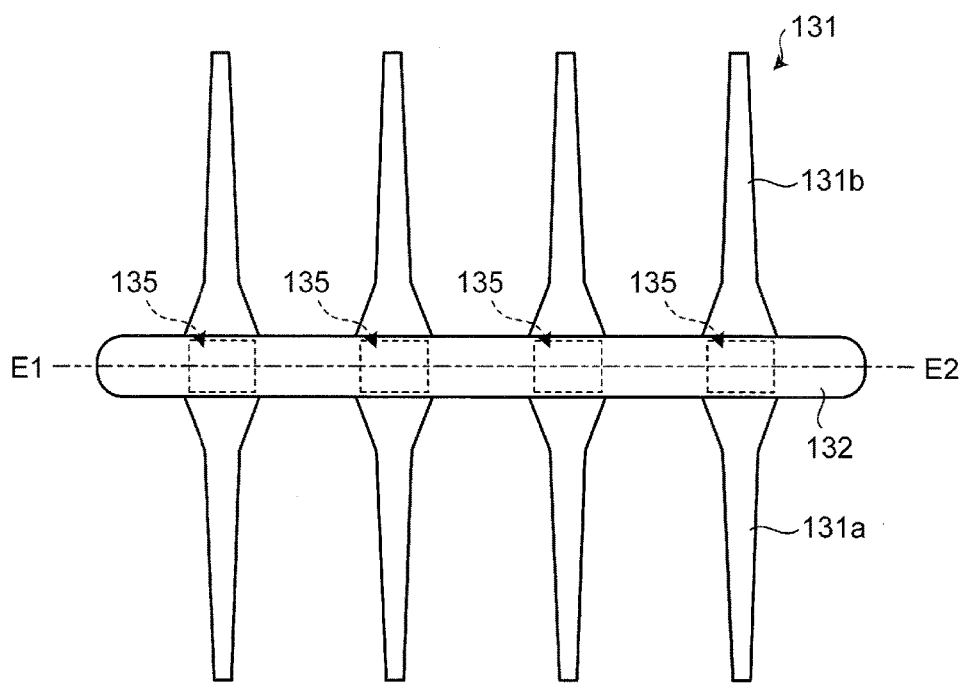
FIG. 14 is a schematic view for explaining the first electrode according to the first embodiment in detail.
Figure 15:
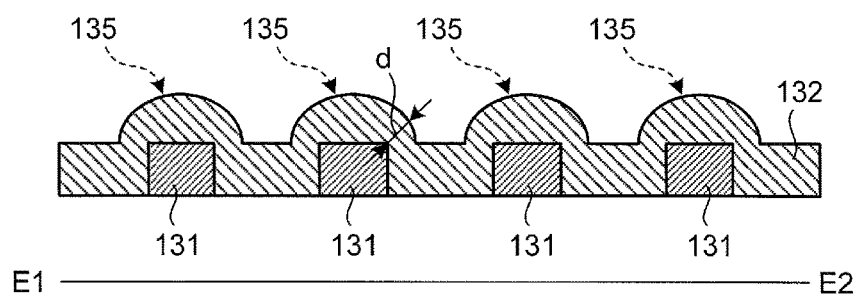
FIG. 15 is a schematic view illustrating a cross section of FIG. 14 taken along line E1-E2.

FIG. 14 is a schematic view for explaining the first electrode according to the first embodiment in detail. FIG. 15 is a schematic view illustrating a cross section of FIG. 14 taken along line E1-E2. As illustrated in FIGS. 14 and 15, the comb tooth portions 131 (the comb tooth portions 131a or the comb tooth portions 131b) according to the first embodiment have joint portions 135 laminated below the electrode base 132. Because of this configuration, a layer in which the comb tooth portions 131a or the comb tooth portions 131b are formed by exposure and a layer in which the electrode base 132 is formed by exposure are not formed at once. Accordingly, the exposure light used at the time of forming the comb tooth portions 131a or the comb tooth portions 131b has less influence on the formation of the electrode base 132. As a result, the width D1 of the electrode base 132 in the X direction can be made equal to or smaller than the width w2. Consequently, the display device 1 according to the first embodiment can improve the response speed while reducing a light transmission loss caused by the first electrode 31.

The electrode base 132 is more preferably made of a conductive metallic material different from the light-transmitting conductive material (light-transmitting conductive oxide) such as indium tin oxide (ITO) as in the comb tooth portions 131a or the comb tooth portions 131b. Examples of the conductive metallic material to be used may include aluminum (Al) and molybdenum (Mo). When the electrode base 132 is made of a metallic material, the electric resistance of the electrode base 132 decreases, so that the width w2 can be made smaller. When the electrode base 132 is made of a metallic material, it becomes easy to apply a dry etching process which can make the electrode base 132 narrower. Accordingly, when the electrode base 132 is made of a metallic material, finer wiring is easily achieved.

Figure 16:
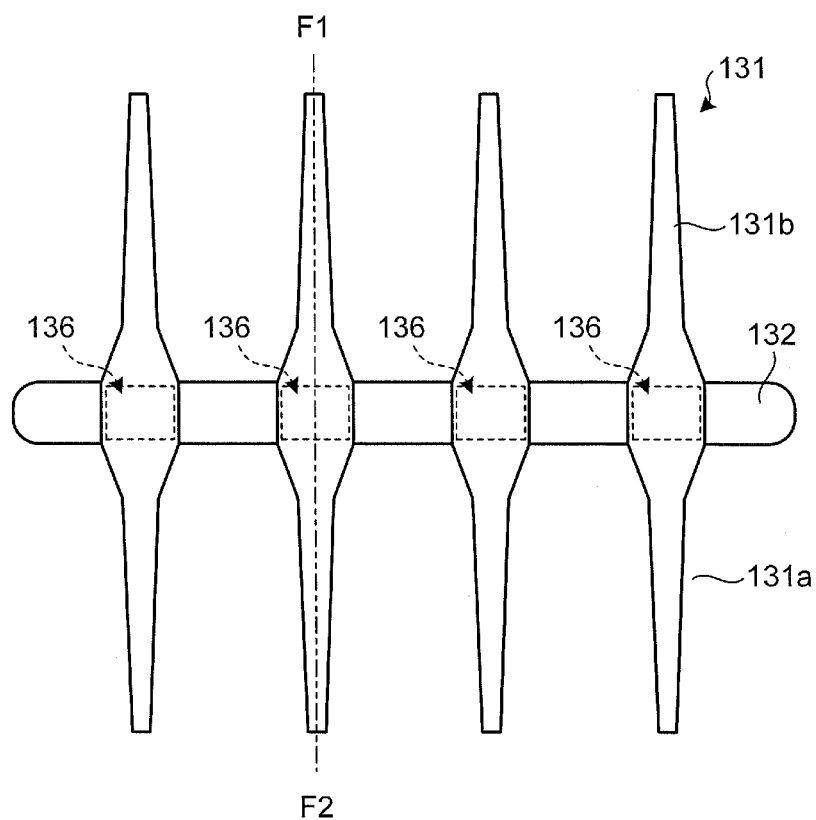
FIG. 16 is a schematic view for explaining a modification of the first electrode according to the first embodiment in detail.
Figure 17:
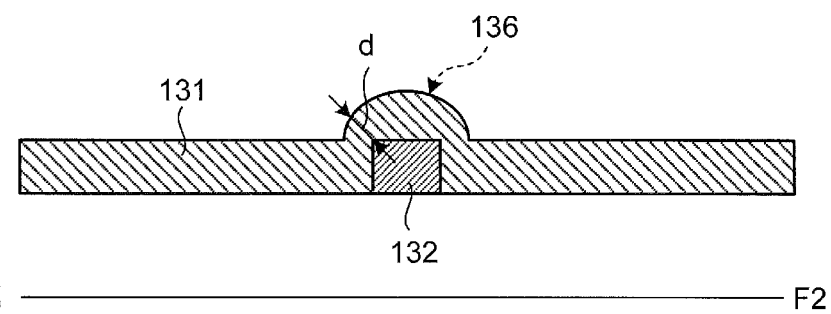
FIG. 17 is a schematic view illustrating a cross section of FIG. 15 taken along line F1-F2.

As illustrated in FIG. 15, in the vicinity of the joint portions 135, it is hard to form the electrode base 132 on the corners of the comb tooth portions 131, and this causes the tendency of a reduced thickness d of an upper layer. The reduced thickness d may cause disconnection. When the electrode base 132 is disconnected, the disconnection may also simultaneously affect the plurality of comb tooth portions 131a or comb tooth portions 131b which are coupled to the electrode base 132. Accordingly, the first electrode 31 according to the first embodiment may be configured as a modification illustrated in FIGS. 16 and 17. FIG. 16 is a schematic view for explaining the modification of the first electrode according to the first embodiment in detail. FIG. 17 is a schematic view illustrating a cross section of FIG. 16 taken along line F1-F2.

As illustrated in FIGS. 16 and 17, the comb tooth portions 131 (comb tooth portions 131a or comb tooth portions 131b) according to the modification of the first embodiment are laminated on the electrode base 132 and have joint portions 136. Because of this configuration, a layer in which the comb tooth portions 131a or the comb tooth portions 131b are formed by exposure and a layer in which the electrode base 132 is formed by exposure are not formed at once. Accordingly, the exposure light used to expose the comb tooth portions 131a or the comb tooth portions 131b has less influence on the formation of the electrode base 132. As a result, the width D1 of the electrode base 132 in the X direction can be made equal to or smaller than the width w2.

In the vicinity of the joint portions 136, it is hard to form a film of the comb tooth portions 131 on the corners of the base electrode 132, and this causes the tendency of a reduced thickness d of an upper layer. The reduced thickness d may cause disconnection. When the comb tooth portions 131 are disconnected, the comb tooth portions 131a or the comb tooth portions 131b are limitedly affected as compared with the case where the electrode base 132 is disconnected.

The electrode base 132 is more preferably made of a metallic material different from the light-transmitting conductive material (light-transmitting conductive oxide) such as indium tin oxide (ITO) as in the comb tooth portions 131a or the comb tooth portions 131b. As the metallic material, the above-described materials can be used. When the electrode base 132 is made of a metallic material, the electric resistance of the electrode base 132 decreases, so that the width w2 can be made smaller. When the electrode base 132 is made of a metallic material, it becomes easy to apply a dry etching process which can make the electrode base 132 narrower. Accordingly, when the electrode base 132 is made of a metallic material, finer wiring is easily achieved.

Manufacturing Method

A method for manufacturing the display device 1 according to the first embodiment includes, for example, the following processes. A manufacturing apparatus performs a first substrate preparation step that prepares a glass substrate which is a light-transmitting substrate as a TFT substrate 71 of the pixel substrate (first substrate) 70A.

Next, the manufacturing apparatus forms the scanning line $24_m$ and the gate electrode 93 on the TFT substrate 71. The manufacturing apparatus then forms the insulating film 741, which is interposed between the scanning line $24_m$ as well as the gate electrode 93 and the semiconductor layer 92, above the TFT substrate 71. The manufacturing apparatus then forms layers, such as the source electrode 91, the drain electrode 90, and the semiconductor layer 92. Next, the manufacturing apparatus forms the insulating film 742 that is interposed between the semiconductor layer 92 and the signal line $25_n$. The manufacturing apparatus then forms the signal line $25_n$, and couples the signal line $25_n$ to the source electrode 91. Next, the manufacturing apparatus forms the insulating film 743 that is interposed between the signal line $25_n$ and the second electrode 32.

Next, the manufacturing apparatus forms the second electrode 32 as a pixel electrode by sputtering, etching, and the like, and couples the drain electrode 90 and the second electrode 32 via the above-described conductive contact 90H. The thickness of the second electrode 32 is, for example, 10 nm to 100 nm. The manufacturing apparatus then forms the insulating film 744 on the second electrode 32 by a plasma CVD method and the like.

Next, the manufacturing apparatus forms the first electrode 31 by sputtering, etching, and the like, and couples the first electrode 31 to the aforementioned common electrode COM. The thickness of the first electrode 31 is, for example, 10 nm to 100 nm. The manufacturing apparatus forms the first electrode 31 in such an order that the comb tooth portions 131 are formed first and then the electrode base 132 are formed as illustrated in FIG. 15. Or alternatively, the manufacturing apparatus forms the first electrode 31 in such an order that the electrode base 132 is formed first and then the comb tooth portions 131 are formed as illustrated in FIG. 17. The first electrode 31 is formed into the shape of comb teeth with the slits S. The manufacturing apparatus forms, above the first electrode 31, the first orientation film 73a made of a polymeric material such as polyimide subjected to the treatment in the rubbing direction Rub. The manufacturing apparatus thus performs the manufacturing processes of the first substrate.

The manufacturing apparatus performs a second substrate preparation step that prepares a glass substrate which is a light-transmitting substrate as a glass substrate 72 of the counter substrate (second substrate) 70B.

The manufacturing apparatus forms a layer of color filter and black matrix on the glass substrate 72, and forms an overcoat layer on top of the layer. The manufacturing apparatus then forms, on the overcoat layer, the second orientation film 73b made of a polymeric material such as polyimide which is subjected to the treatment in antiparallel (in the direction opposite) to the rubbing direction Rub. The manufacturing apparatus thus performs the manufacturing processes of the second substrate.

The manufacturing apparatus places the pixel substrate 70A and the counter substrate 70B so as to face each other, injects a liquid crystal therebetween, and seals with a frame portion to form the liquid crystal layer 70C. A polarizing plate and/or a backlight and the like, are mounted at the rear side of the pixel substrate 70A, and a polarizing plate and the like are mounted at the front face side. The aforementioned driver IC 3 is coupled to an electrode end of the above-described frame portion, whereby the display device 1 is manufactured.

Although amorphous silicon (a-Si) was used for the semiconductor layer 92 that forms the TFT element Tr in the first embodiment, the present disclosure is not limited to this configuration. Polycrystalline silicon (poly-Si) may be used for the semiconductor layer 92. In place of silicon, other semiconducting materials (such as germanium (Ge)), or materials (such as silicon germanium (Site)) prepared by adding other materials to silicon may be used. Oxide semiconductor materials may also be used for the semiconductor layer 92. Examples of such an oxide semiconductor material used may include oxide semiconductor materials containing indium (In).

In the first embodiment, the TFT element Tr is a bottom gate TFT having the gate electrode 93 provided below the semiconductor layer. If possible, a top gate TFT configuration in which the gate electrode 93 is provided above the semiconductor layer may be used.

First Modification of First Embodiment

Figure 18:
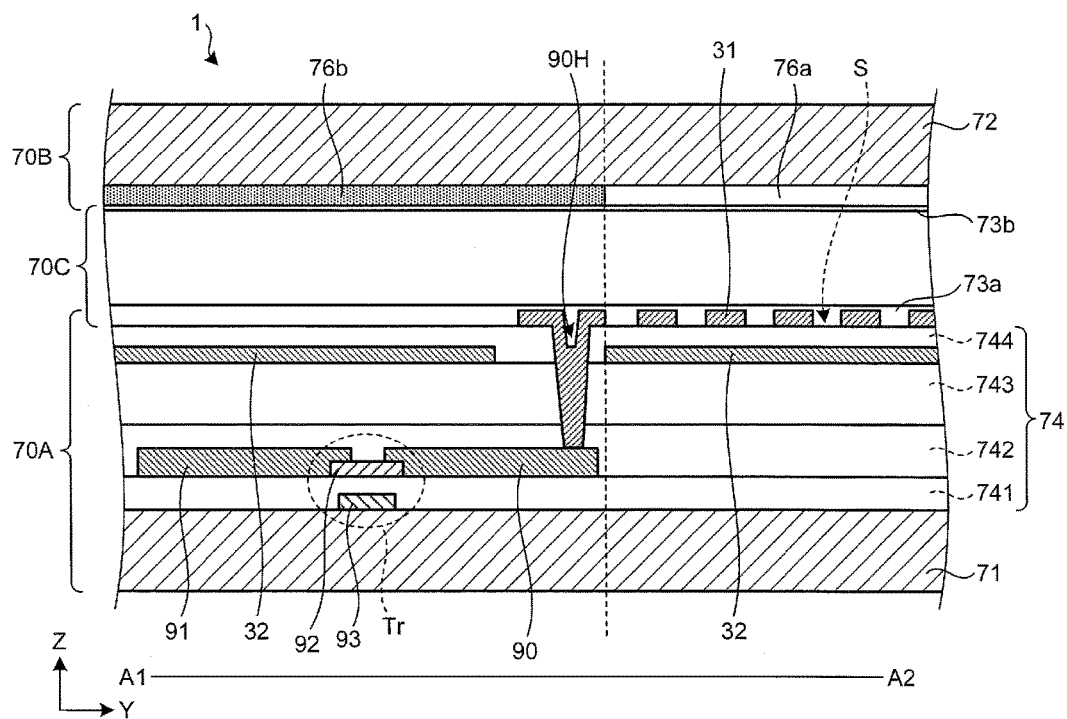
FIG. 18 is a schematic view illustrating a modification of the cross section of FIG. 3 taken along line A1-A2.

A description will now be given of a display device 1 according to a first modification of the first embodiment. FIG. 18 is a schematic view illustrating a modification in the cross section of FIG. 3 taken along line A1-A2. Constituent elements identical to those described in the above-described first embodiment are designated by identical reference numerals to omit redundant description.

In the display device 1 according to the first modification of the first embodiment, an electric field (a transverse electric field) is generated between the first electrode 31 and the second electrode 32 which are laminated in the direction (Z direction) perpendicular to the surface of the TFT substrate 71 of the pixel substrate 70A. Since the electric field is generated in the direction parallel to the TFT substrate 71, the liquid crystal molecules in the liquid crystal layer 70C are caused to rotate in a plane parallel to the substrate surface. Display operation is performed by using the change in optical transmittance in response to the rotation of the liquid crystal molecules. For example, the second electrode 32 illustrated in FIG. 18 corresponds to the aforementioned common electrode COM, and the first electrode 31 corresponds to the aforementioned pixel electrode. For example, the first electrode 31 is coupled to the drain electrode 90 via the conductive contact 90H. The respective first electrodes 31 are sectioned in accordance with the respective regions of the pixels Vpix described before. Accordingly, the first electrodes 31 in the adjacent pixels Vpix are insulated from each other to form independent patterns.

Second Modification of First Embodiment

Figure 19:
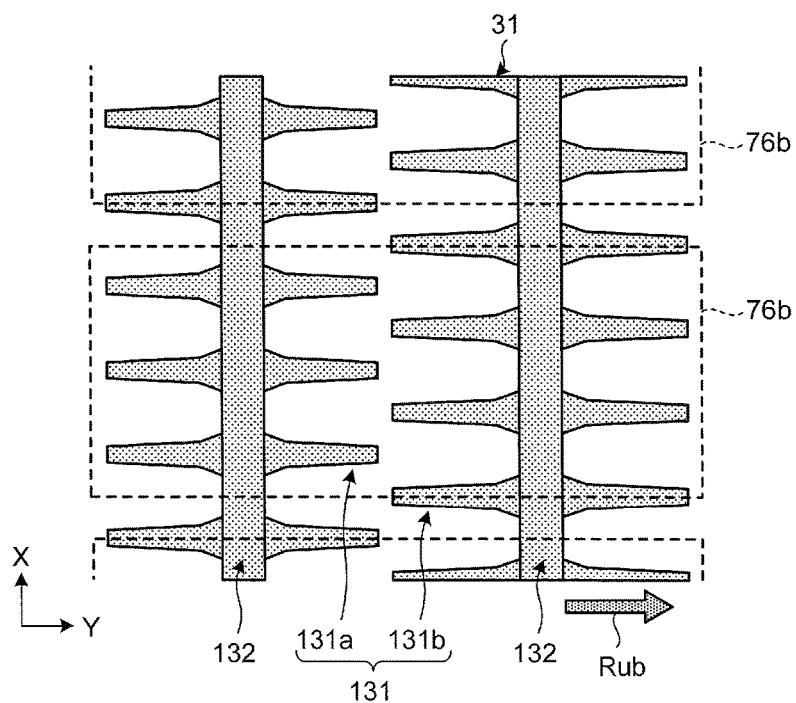
FIG. 19 is a schematic view for explaining a modification of the relationship between the shape of the first electrode and the opening according to the first embodiment.

A description will now be given of a display device 1 according to a second modification of the first embodiment. FIG. 19 is a schematic view for explaining a modification of the relationship between the shape of the first electrode and the opening according to the first embodiment. Constituent elements identical to those described in the above-described first embodiment are designated by identical reference numerals to omit redundant description.

The first electrode 31 includes a plurality of comb tooth portions 131 protruding from the electrode base 132 extending in the X direction. The comb tooth portions 131 include comb tooth portions 131a and comb tooth portions 131b which extend from the electrode base 132 in directions opposite to each other. The plurality of adjacent comb tooth portions 131a protrude from the electrode base 132 at constant intervals. Similarly, the plurality of adjacent comb tooth portions 131b protrude from the electrode base 132 at constant intervals. From one electrode base 132, the comb tooth portions 131a extend in the Y direction and the comb tooth portions 131b extend also in the Y direction but are directed in a direction opposite to the direction of the comb tooth portions 131a.

Accordingly, the rubbing treatment is applied to the above-described first orientation film 73a in a rubbing direction Rub illustrated in FIG. 19 so that the first orientation film 73a has a predetermined initial orientation in the Y direction. The rubbing treatment is applied to the second orientation film 73b, in a direction antiparallel to the rubbing direction Rub of the first orientation film 73a. The rubbing directions of the first orientation film 73a and the second orientation film 73b are in a relation antiparallel to each other.

Third Modification of First Embodiment

Figure 20:
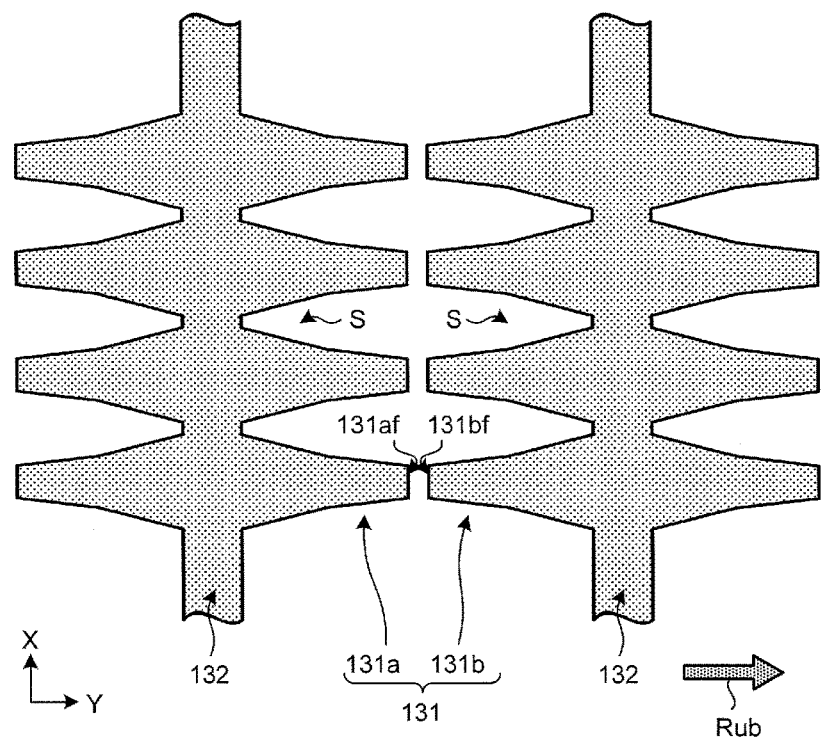
FIG. 20 is a schematic view for explaining a modification of the relationship between the shape of the first electrode and the opening according to the first embodiment.

A description will now be given of a display device 1 according to a third modification of the first embodiment. FIG. 20 is a schematic view for explaining a modification of the relationship between the shape of the first electrode and the opening according to the first embodiment. Constituent elements identical to those described in the above-described first embodiment are designated by identical reference numerals to omit redundant description.

The first electrode 31 includes the plurality of comb tooth portions 131 protruding from the electrode base 132 extending in the Y direction. The comb tooth portions 131 include comb tooth portions 131a and comb tooth portions 131b which extend from the electrode base 132 in directions opposite to each other. The plurality of adjacent comb tooth portions 131a protrude from the electrode base 132 at constant intervals. Similarly, the plurality of adjacent comb tooth portions 131b protrude from the electrode base 132 at constant intervals. From one electrode base 132, the comb tooth portions 131a extend in the X direction and the comb tooth portions 131b extend also in the X direction but are directed in a direction opposite to the direction of the comb tooth portions 131a.

Accordingly, the rubbing treatment is applied to the above-described first orientation film 73a in a rubbing direction Rub illustrated in FIG. 20 so that the first orientation film 73a has a predetermined initial orientation in the X direction. The rubbing treatment is applied to the second orientation film 73b, in a direction antiparallel to the rubbing direction Rub of the first orientation film 73a. The rubbing directions of the first orientation film 73a and the second orientation film 73b are in a relation antiparallel to each other.

In this modification, a distal end 131af of the comb tooth portion 131a and a distal end 131bf of the comb tooth portion 131b face each other.

Fourth Modification of First Embodiment

Figure 21:
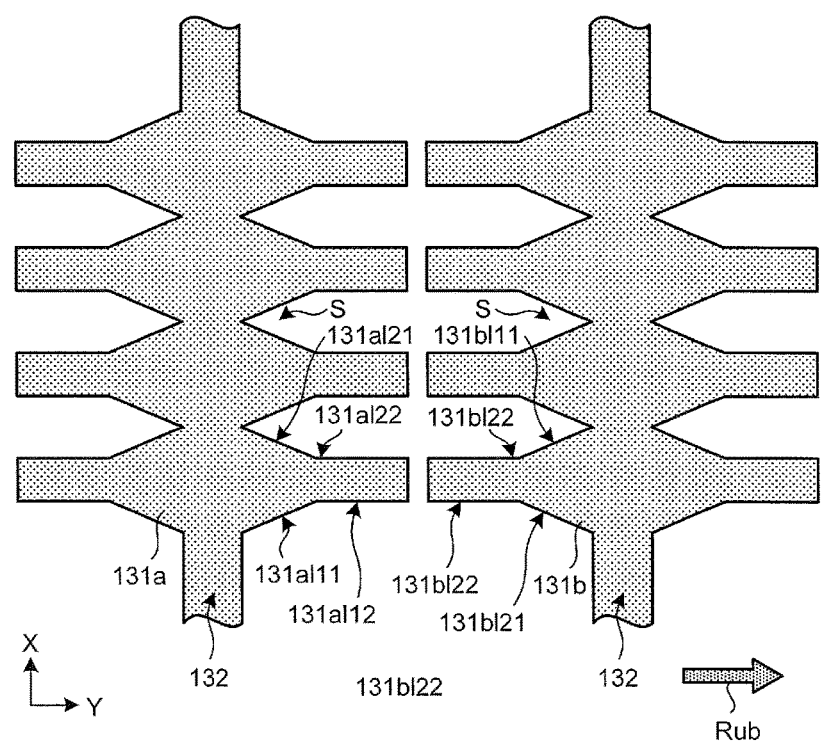
FIG. 21 is a schematic view for explaining a modification of the relationship between the shape of the first electrode and the opening according to the first embodiment.

A description will now be given of a display device 1 according to a fourth modification of the first embodiment. FIG. 21 is a schematic view for explaining a modification of the relationship between the shape of the first electrode and the opening according to the first embodiment. Constituent elements identical to those described in the above-described first embodiment are designated by identical reference numerals to omit redundant description.

The first electrode 31 includes the plurality of comb tooth portions 131 protruding from the electrode base 132 extending in the Y direction. The comb tooth portions 131 include comb tooth portions 131a and comb tooth portions 131b which extend from the electrode base 132 in directions opposite to each other. The plurality of adjacent comb tooth portions 131a protrude from the electrode base 132 at constant intervals. Similarly, the plurality of adjacent comb tooth portions 131b protrude from the electrode base 132 at constant intervals. From one electrode base 132, the comb tooth portions 131a extend in the X direction and the comb tooth portions 131b extend also in the X direction but are directed in a direction opposite to the direction of the comb tooth portions 131a.

Accordingly, the rubbing treatment is applied to the above-described first orientation film 73a in a rubbing direction Rub illustrated in FIG. 21 so that the first orientation film 73a has a predetermined initial orientation in the X direction. The rubbing treatment is applied to the second orientation film 73b, in a direction antiparallel to the rubbing direction Rub of the first orientation film 73a. The rubbing directions of the first orientation film 73a and the second orientation film 73b are in a relation antiparallel to each other.

In the display device 1 of the present modification, a distal end-side part 131a/12 of the right long side of the comb tooth portion 131a is parallel to the X direction. In the display device 1 of this modification, an angle between a base-side part 131a/11, which is low in contribution to optical transmittance, and the X direction is made larger to regulate the liquid crystal molecular orientation and to trigger the liquid crystal rotation, so that the stability in liquid crystal molecular orientation is improved. At the same time, in the display device 1 of this modification, the distal end-side part 131a/12 is made parallel to the X direction so as to improve the optical transmittance. As a consequence, the display device 1 of this modification can harmonize the improvement in stability of liquid crystal molecular orientation and improvement in optical transmittance.

Similarly, in the display device 1 of this modification, a distal end-side part 131a/22 of the left long side of the comb tooth portion 131a is parallel to the X direction. In the display device 1 of this modification, an angle between a base-side part 131a/21, which is low in contribution to optical transmittance, and the X direction is made larger to regulate the liquid crystal molecular orientation and to trigger the liquid crystal rotation, so that the stability in liquid crystal molecular orientation is improved. At the same time, in the display device 1 of this modification, the distal end-side part 131a/22 is made parallel to the X direction to improve the optical transmittance. As a consequence, the display device 1 of this modification can harmonize the improvement in stability of liquid crystal molecular orientation and improvement in optical transmittance.

Similarly, in the display device 1 of this modification, a distal end-side part 131b/12 of the right long side of the comb tooth portion 131b is parallel to the X direction. In the display device 1 of this modification, an angle between a base-side part 131b/11, which is low in contribution to optical transmittance, and the X direction is made larger to regulate the liquid crystal molecular orientation and to trigger the liquid crystal rotation, so that the stability in liquid crystal molecular orientation is improved. At the same time, in the display device 1 of this modification, the distal end-side part 131*b*/12 is made parallel to the X direction to improve the optical transmittance. As a consequence, the display device 1 of this modification can harmonize the improvement in stability of liquid crystal molecular orientation and improvement in optical transmittance.

Similarly, in the display device 1 of this modification, a distal end-side part 131*b*/22 of the left long side of the comb tooth portion 131*b* is parallel to the X direction. In the display device 1 of this modification, an angle between a base-side part 131*b*/21, which is low in contribution to optical transmittance, and the X direction is made larger to regulate the liquid crystal molecular orientation and to trigger the liquid crystal rotation, so that the stability in liquid crystal molecular orientation is improved. At the same time, in the display device 1 of this modification, the distal end-side part 131*b*/22 is made parallel to the X direction to improve the optical transmittance. As a consequence, the display device 1 of this modification can harmonize the improvement in stability of liquid crystal molecular orientation and improvement in optical transmittance.

Fifth Modification of First Embodiment

Figure 22:
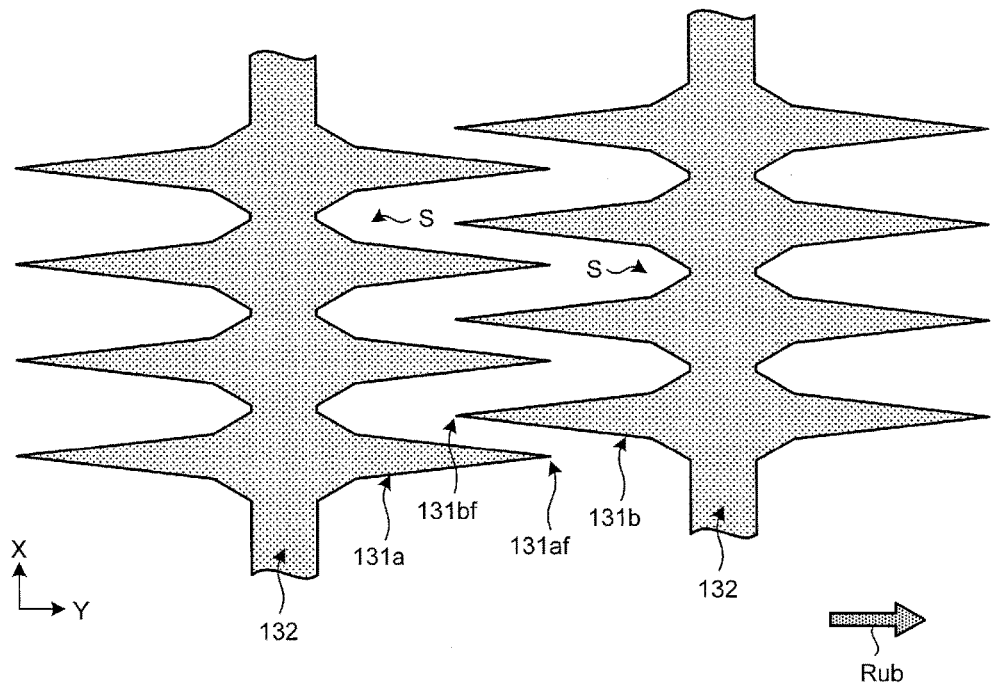
FIG. 22 is a schematic view for explaining a modification of the relationship between the shape of the first electrode and the opening according to the first embodiment.

A description will now be given of a display device 1 according to a fifth modification of the first embodiment. FIG. 22 is a schematic view for explaining a modification of the relationship between the shape of the first electrode and the opening according to the first embodiment. Constituent elements identical to those described in the above-described first embodiment are designated by identical reference numerals to omit redundant description.

The first electrode 31 includes the plurality of comb tooth portions 131 protruding from the electrode base 132 extending in the Y direction. The comb tooth portions 131 include comb tooth portions 131*a* and comb tooth portions 131*b* which extend from the electrode base 132 in directions opposite to each other. The plurality of adjacent comb tooth portions 131*a* protrude from the electrode base 132 at constant intervals. Similarly, the plurality of adjacent comb tooth portions 131*b* protrude from the electrode base 132 at constant intervals. From one electrode base 132, the comb tooth portions 131*a* extend in the X direction and the comb tooth portions 131*b* extend also in the X direction but are directed in a direction opposite to the direction of the comb tooth portions 131*a*.

Accordingly, the rubbing treatment is applied to the above-described first orientation film 73*a* in a rubbing direction Rub illustrated in FIG. 22 so that the first orientation film 73*a* has a predetermined initial orientation in the X direction. The rubbing treatment is applied to the second orientation film 73*b*, in a direction antiparallel to the rubbing direction Rub of the first orientation film 73*a*. The rubbing directions of the first orientation film 73*a* and the second orientation film 73*b* are in a relation antiparallel to each other.

In the display device 1 of this modification, a distal end 131*af* of the comb tooth portion 131*a* is pointed and extends into a slit formed between the comb tooth portions 131*b* that face the comb tooth portion 131*a*. Similarly, a distal end 131*bf* of the comb tooth portion 131*b* is pointed and extends into a slit formed between the comb tooth portions 131*a* that face comb tooth portion 131*b*.

In the display device 1 of this modification, an angle between the base-side parts of the comb tooth portions 131*a* and 131*b*, which are low in contribution to optical transmittance, and the X direction is made larger to regulate the liquid crystal molecular orientation and to trigger the liquid crystal rotation, so that the stability in liquid crystal molecular orientation is improved. At the same time, in the display device 1 of this modification, the distal end 131*af* of the comb tooth portion 131*a* extends into a slit formed between the comb tooth portions 131*b* that face the comb tooth portion 131*a*, and the distal end 131*bf* of the comb tooth portion 131*b* extends into a slit formed between the comb tooth portions 131*a* that face the comb tooth portion 131*a*, whereby the optical transmittance is improved. As a consequence, the display device 1 of this modification can harmonize the improvement in stability of liquid crystal molecular orientation and improvement in optical transmittance.

Sixth Modification of First Embodiment

Figure 23:
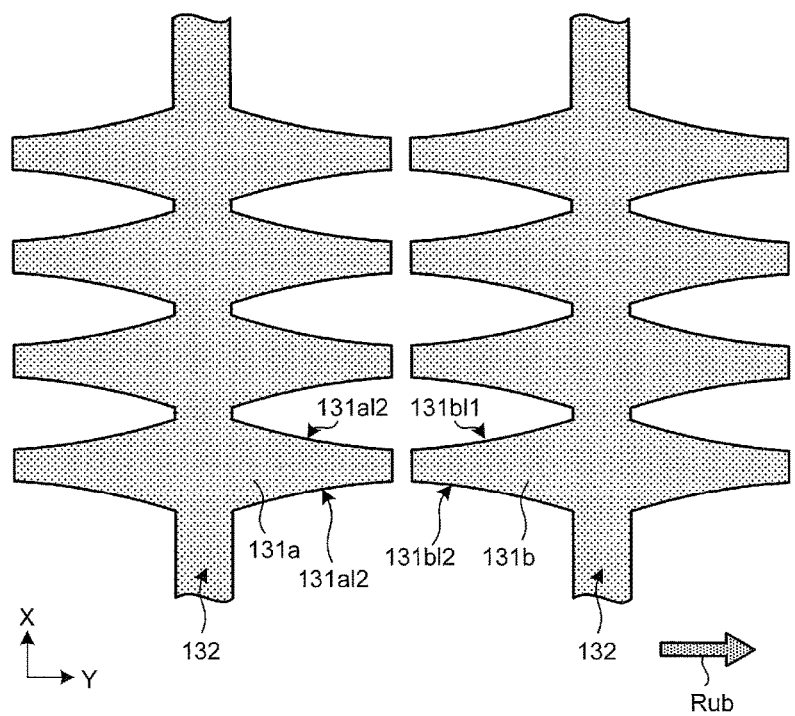
FIG. 23 is a schematic view for explaining a modification of the relationship between the shape of the first electrode and the opening according to the first embodiment.

A description will now be given of a display device 1 according to a sixth modification of the first embodiment. FIG. 23 is a schematic view for explaining a modification of the relationship between the shape of the first electrode and the opening according to the first embodiment. Constituent elements identical to those described in the above-described first embodiment are designated by identical reference numerals to omit redundant description.

The first electrode 31 includes the plurality of comb tooth portions 131 protruding from the electrode base 132 extending in the Y direction. The comb tooth portions 131 include comb tooth portions 131*a* and comb tooth portions 131*b* which extend from the electrode base 132 in directions opposite to each other. The plurality of adjacent comb tooth portions 131*a* protrude from the electrode base 132 at constant intervals. Similarly, the plurality of adjacent comb tooth portions 131*b* protrude from the electrode base 132 at constant intervals. From one electrode base 132, the comb tooth portions 131*a* extend in the X direction and the comb tooth portions 131*b* extend also in the X direction but are directed in a direction opposite to the direction of the comb tooth portions 131*a*.

Accordingly, the rubbing treatment is applied to the above-described first orientation film 73*a* in a rubbing direction Rub illustrated in FIG. 23 so that the first orientation film 73*a* has a predetermined initial orientation in the X direction. The rubbing treatment is applied to the second orientation film 73*b*, in a direction antiparallel to the rubbing direction Rub of the first orientation film 73*a*. The rubbing directions of the first orientation film 73*a* and the second orientation film 73*b* are in a relation antiparallel to each other.

In the display device 1 of this modification, a right long side 131*a*/1 of the comb tooth portion 131*a* does not have a bending point but has a continuously varied shape (like a curve). At the bending point, the liquid crystal molecular orientation drastically changes, so that the liquid crystal molecular orientation tends to be disordered. In the display device 1 of this modification, the right long side 131*a*/1 of the comb tooth portion 131*a* does not have a bending point and therefore there is no point where the liquid crystal molecular orientation drastically changes. This makes it possible to prevent the liquid crystal molecular orientation from being disordered.

Similarly, in the display device 1 of this modification, a left long side 131*a*/2 of the comb tooth portion 131*a* does not have a bending point but has a continuously varied shape (like a curve). At the bending point, the liquid crystal molecular orientation drastically changes, so that the liquid crystal molecular orientation tends to be disordered. In the display device 1 of this modification, the left long side 131*a*/2 of the comb tooth portion 131*a* does not have a bending point and therefore there is no point where the liquid crystal molecular orientation drastically changes. This makes it possible to prevent the liquid crystal molecular orientation from being disordered.

Similarly, in the display device 1 of this modification, a right long side 131*b*/1 of the comb tooth portion 131*b* does not have a bending point but has a continuously varied shape (like a curve). At the bending point, the liquid crystal molecular orientation drastically changes, so that the liquid crystal molecular orientation tends to be disordered. In the display device 1 of this modification, the right long side 131*b*/1 of the comb tooth portion 131*b* does not have a bending point and therefore there is no point where the liquid crystal molecular orientation drastically changes. This makes it possible to prevent the liquid crystal molecular orientation from being disordered.

Similarly, in the display device 1 of this modification, a left long side 131*b*/2 of the comb tooth portion 131*b* does not have a bending point but has a continuously varied shape (like a curve). At the bending point, the liquid crystal molecular orientation drastically changes and so the liquid crystal molecular orientation tends to be disordered. In the display device 1 of this modification, the left long side 131*b*/2 of the comb tooth portion 131*b* does not have a bending point and therefore there is no point where the liquid crystal molecular orientation drastically changes. This makes it possible to prevent the liquid crystal molecular orientation from being disordered.

1-2. Second Embodiment

Figure 24:
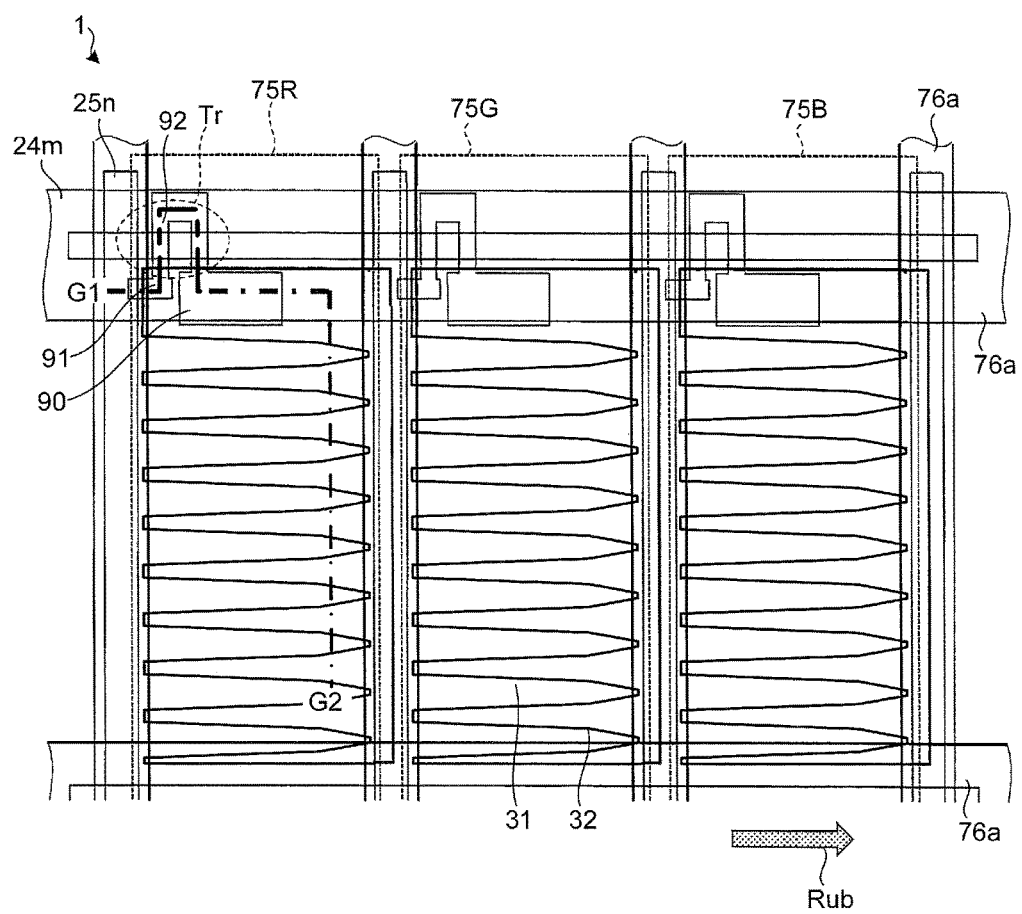
FIG. 24 is a plan view for explaining pixels of a display device according to a second embodiment.
Figure 25:
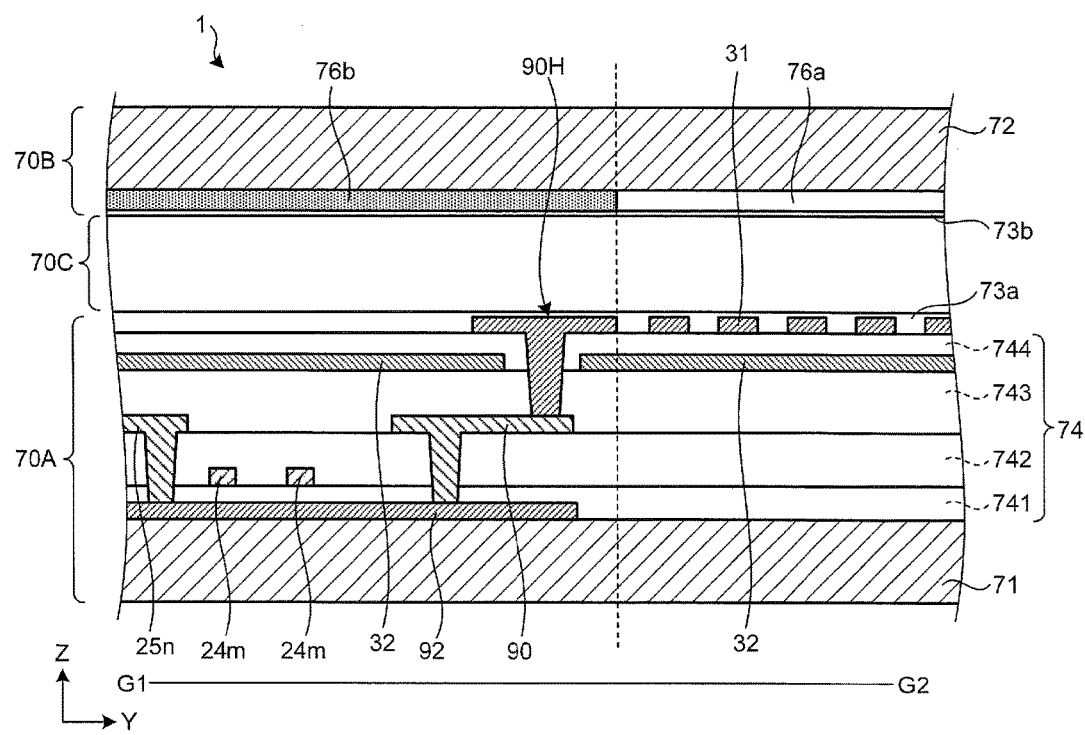
FIG. 25 is a schematic view illustrating a cross section of FIG. 24 taken along line G1-G2.
Figure 26:
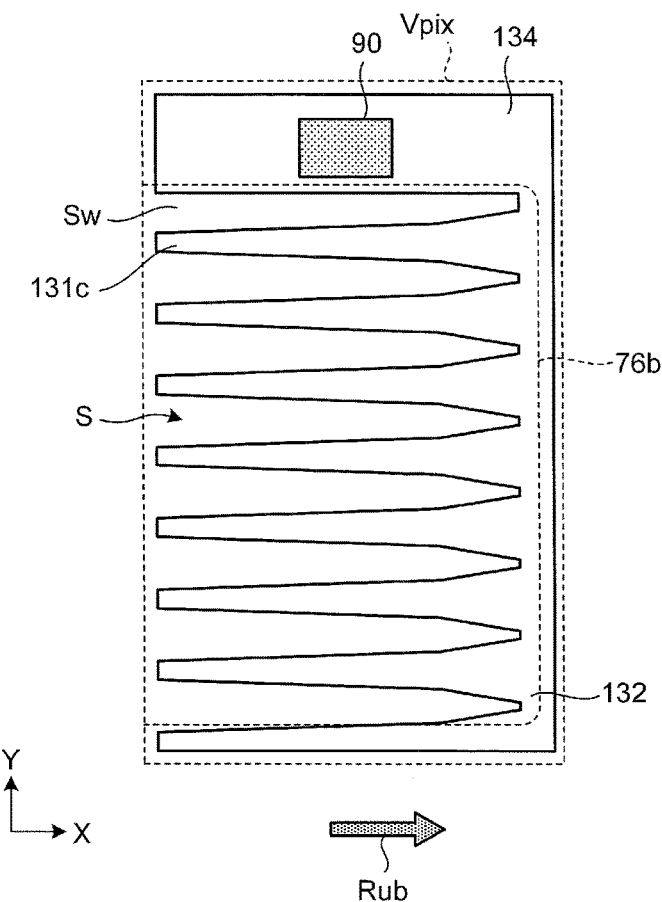
FIG. 26 is a schematic view for explaining the relationship between the shape of a first electrode and an opening according to the second embodiment.

A description will now be given of a display device 1 according to a second embodiment. FIG. 24 is a plan view for explaining pixels of the display device according to the second embodiment. FIG. 25 is a schematic view illustrating a cross section of FIG. 24 taken along line G1-G2. FIG. 26 is a schematic view for explaining the relationship between the shape of a first electrode and an opening according to the second embodiment. Constituent elements identical to those described in the above-described first embodiment are designated by identical reference numerals to omit redundant description.

As illustrated in FIG. 24, the semiconductor layer 92 is made of polycrystalline silicon (poly-Si) that forms a TFT element Tr. The semiconductor layer 92 is a double-gate transistor that forms a channel from the gate electrode 92 and two regions.

As illustrated in FIGS. 24 and 25, in the display device 1 according to the second embodiment, an electric field (transverse electric field) is generated between the first electrode 31 and the second electrode 32 which are laminated in the direction (Z direction) perpendicular to the surface of the TFT substrate 71 of the pixel substrate 70A. Since the electric field is generated in the direction parallel to the TFT substrate 71, the liquid crystal molecules in the liquid crystal layer 70C are caused to rotate in a plane parallel to the substrate surface. Display operation is performed by using the change in optical transmittance in response to the rotation of the liquid crystal molecules. For example, the second electrode 32 illustrated in FIG. 25 corresponds to the aforementioned common electrode COM, and the first electrode 31 corresponds to the aforementioned pixel electrode. For example, the first electrode 31 is coupled to the drain electrode 90 via the conductive contact 90H. The respective first electrodes 31 are sectioned in accordance with the respective regions of the pixels Vpix described before. Accordingly, the first electrodes 31 in the adjacent pixels Vpix are insulated from each other to form independent patterns.

As illustrated in FIG. 26, the first electrode 31 is formed like teeth of a comb due to the presence of slits S that are regions without the conductive material. The first electrode 31 includes the plurality of comb tooth portions 131 protruding from the electrode base 132 extending in the Y direction. Unlike the first embodiment described in the foregoing, the comb tooth portions 131 include comb tooth portions 131*c* that extend in one direction from the electrode base 132. The plurality of adjacent comb tooth portions 131*c* protrude from the electrode base 132 at constant intervals. From one electrode base 132, the comb tooth portions 131*c* extend in a direction opposite to the X direction. From one electrode base 132, the comb tooth portions 131*c* may be made to extend in the X direction.

The rubbing treatment is applied to the above-described first orientation film 73*a* in the rubbing direction Rub illustrated in FIGS. 24 and 26 so that the first orientation film 73*a* has a predetermined initial orientation in the X direction. The rubbing treatment is applied to the second orientation film 73*b*, in a direction antiparallel to the rubbing direction Rub of the first orientation film 73*a*. The rubbing directions of the first orientation film 73*a* and the second orientation film 73*b* are in a relation antiparallel to each other.

Figure 27:
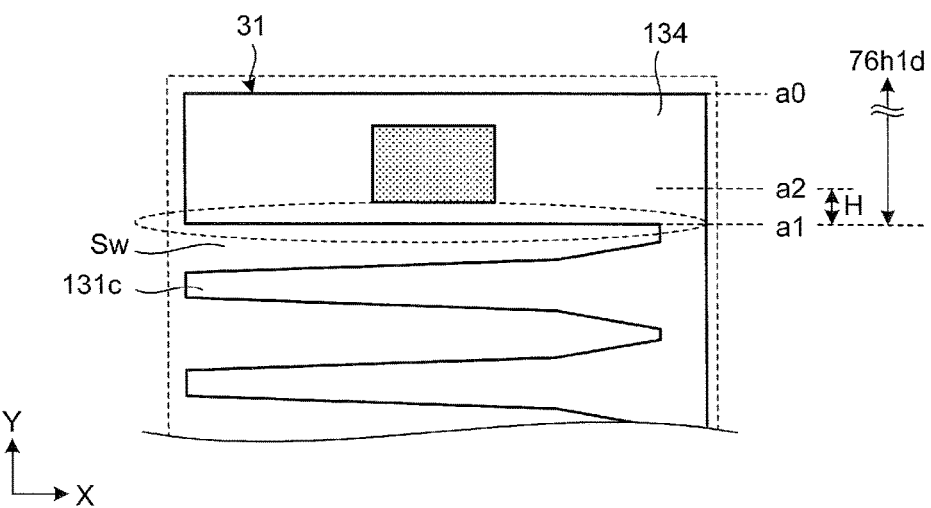
FIG. 27 is a schematic view for explaining the relationship between the shape of the first electrode and a light shielding portion according to the second embodiment.

FIG. 27 is a schematic view for explaining the relationship between the shape of the first electrode and a light shielding portion according to the second embodiment. The black matrix 76*a* is required to shield light at least up to the position of a width 76*h*1*d* illustrated in FIG. 27 to hide the contact 90H. An electric field applied to an endmost slit Sw between a comb tooth portion 134 that is in contact with the contact 90H and is close to the edge of the opening 76*b* and a comb tooth portion 131*c* is different in distribution from an electric field applied to slits S between the adjacent comb tooth portions 131*c*. Accordingly, the black matrix 76*a* shields light at least up to the position of a width 76*h*1*b* illustrated in FIG. 27 to hide the entire comb tooth portion 134. This makes it possible to approximate the change rate of transmittance in the endmost slit Sw to that in the slits S. If the black matrix 76*a* shields light in the range from an outer edge a0 of the comb tooth portion 134 to a position a2 of the contact 90H so as to hide the contact 90H, at least deterioration or disorder in the luminance can be reduced. With this configuration, the luminance in the openings 76*b* can be made uniform.

In the liquid crystal layer 70C of the display device 1 according to the second embodiment, like that of the display device 1 according to the first embodiment described above, when a voltage is applied to the first electrode 31 and the second electrode 32, the liquid crystal molecules in the vicinity of the aforementioned right long side 131R, which is one of facing sides of the comb tooth portions 131*c* adjacent in a width direction of the slits S, rotate in the direction opposite to the rotation direction of the liquid crystal molecules in the vicinity of the aforementioned left long side 131L which is the other of the facing sides of the adjacent comb tooth portions 131*c*. Accordingly, as compared with the FFS-mode display device disclosed in JP-A-2008-52161, the display device according to the second embodiment is configured so that the liquid crystal molecules react to changes in the electric fields between the first electrode 31 and the second electrode 32 at high speed. This improves the response speed of the display device 1 according to the second embodiment.

Figure 28:
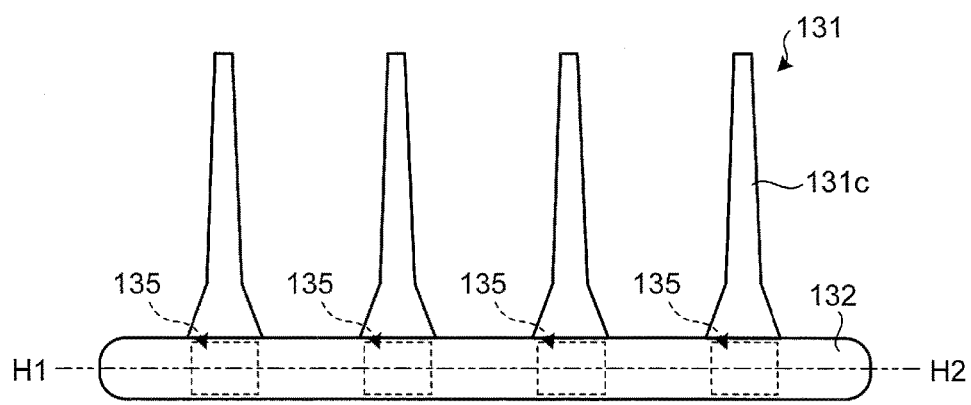
FIG. 28 is a schematic view for explaining the first electrode according to the second embodiment in detail.
Figure 29:
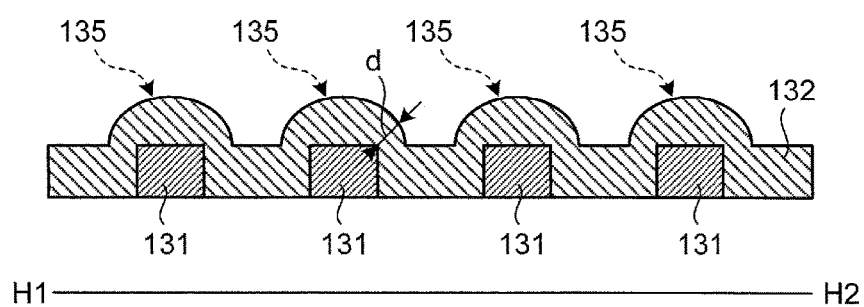
FIG. 29 is a schematic view illustrating a cross section of FIG. 28 taken along line H1-H2.

FIG. 28 is a schematic view for explaining the first electrode according to the second embodiment in detail. FIG. 29 is a schematic view illustrating a cross section of FIG. 28 taken along line H1-H2. As illustrated in FIGS. 28 and 29, the comb tooth portions 131 (the comb tooth portions 131c) according to the second embodiment have joint portions 135 laminated beneath the electrode base 132. Because of this configuration, a layer in which the comb tooth portions 131c are formed by exposure and a layer in which the electrode base 132 is formed by exposure are not formed at once. Accordingly, the exposure light used to expose the comb tooth portions 131c has less influence on the formation of the electrode base 132. As a result, the width D1 of the electrode base 132 in the X direction can be made equal to or smaller than the width w2 as described above. Consequently, the display device 1 according to the second embodiment can improve the response speed while reducing a light transmission loss caused by the first electrode 31.

The electrode base 132 is more preferably made of a metallic material different from the light-transmitting conductive material (light-transmitting conductive oxide) such as indium tin oxide (ITO) as in the comb tooth portions 131c. As the metallic material, the materials mentioned before can be used. When the electrode base 132 is made of a metallic material, the electric resistance of the electrode base 132 decreases, so that the width w2 can be made smaller. When the electrode base 132 is made of a metallic material, it becomes easy to apply a dry etching process which can make the electrode base 132 narrower. Accordingly, when the electrode base 132 is made of a metallic material, finer wiring is easily achieved.

Figure 30:
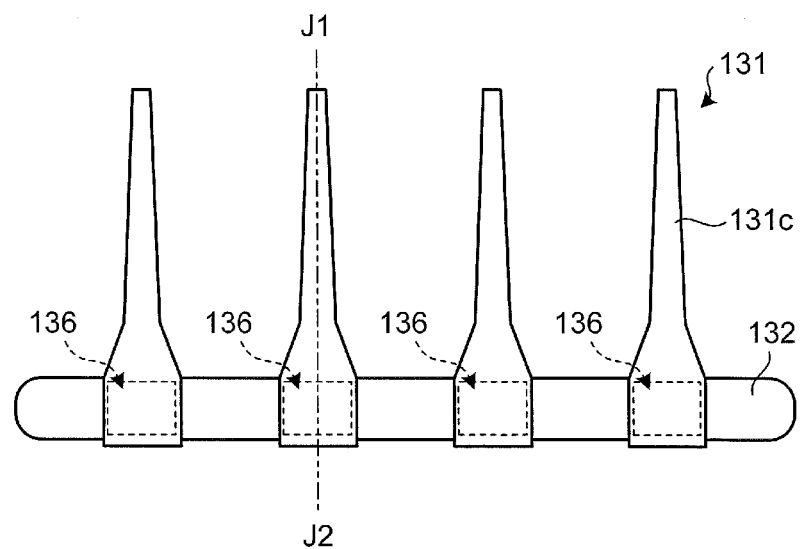
FIG. 30 is a schematic view for explaining a modification of the first electrode according to the second embodiment in detail.
Figure 31:
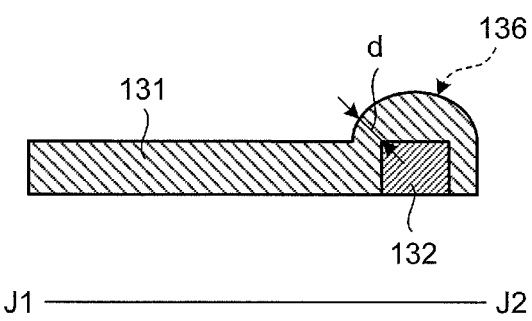
FIG. 31 is a schematic view illustrating a cross section of FIG. 30 taken along line J1-J2.

As illustrated in FIG. 29, in the vicinity of the joint portions 135, it is hard to form the electrode base 132 on the corners of the comb tooth portions 131, and this causes the tendency of a reduced thickness d of an upper layer. The reduced thickness d may cause disconnection. When the electrode base 132 is disconnected, the disconnection may also simultaneously affect the plurality of comb tooth portions 131c which are coupled to the electrode base 132. Accordingly, the first electrode 31 according to the second embodiment may be configured as a modification illustrated in FIGS. 30 and 31. FIG. 30 is a schematic view for explaining the modification of the first electrode according to the second embodiment in detail. FIG. 31 is a schematic view illustrating a cross section of FIG. 30 taken along line J1-J2.

As illustrated in FIGS. 30 and 31, the comb tooth portions 131 (comb tooth portions 131c) according to the modification of the second embodiment are laminated on the electrode base 132 and have joint portions 136. Because of this configuration, a layer in which the comb tooth portions 131c are formed by exposure and a layer in which the electrode base 132 is formed by exposure are not formed at once. Accordingly, the exposure light used to expose the comb tooth portions 131c has less influence on the formation of the electrode base 132. As a result, the width D1 of the electrode base 132 in the X direction can be made equal to or smaller than the width w2.

In the vicinity of the joint portions 136, it is hard to form a film of the comb tooth portions 131 on the corners of the base electrode 132, and this causes the tendency of a reduced thickness d of an upper layer. The reduced thickness d may cause disconnection. When the comb tooth portion 131 is disconnected, the comb tooth portions 131c are limitedly affected as compared with the case where the electrode base 132 is disconnected.

The electrode base 132 is more preferably made of a metallic material different from the light-transmitting conductive material (light-transmitting conductive oxide) such as indium tin oxide (ITO) as in the comb tooth portions 131c. As the metallic material, the above-described materials can be used. When the electrode base 132 is made of a metallic material, the electric resistance of the electrode base 132 decreases, so that the width w2 can be made smaller. When the electrode base 132 is made of a metallic material, it becomes easy to apply a dry etching process which can make the electrode base 132 narrower. Accordingly, when the electrode base 132 is made of a metallic material, fine wiring is easily achieved.

First Modification of Second Embodiment

Figure 32:
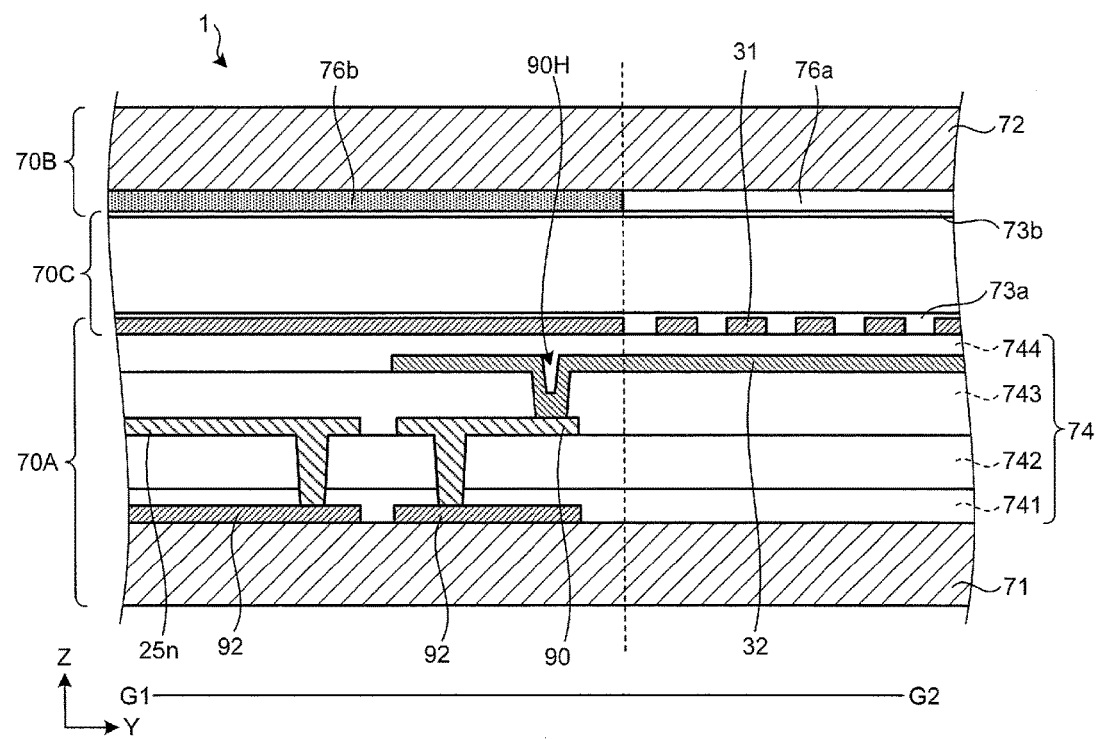
FIG. 32 is a schematic view illustrating a modification of the cross section of FIG. 24 taken along line G1-G2.

A description will now be given of a display device 1 according to a first modification of the first embodiment. FIG. 32 is a schematic view illustrating a modification in a cross section of FIG. 24 taken along line G1-G2. Constituent elements identical to those described in the above-described first and second embodiments are designated by identical reference numerals to omit redundant description.

In the display device 1 according to the first modification of the second embodiment, an electric field (transverse electric field) is generated between the first electrode 31 and the second electrode 32 which are laminated in the direction (Z direction) perpendicular to the surface of the TFT substrate 71 of the pixel substrate 70A. Since the electric field is generated in the direction parallel to the TFT substrate 71, the liquid crystal molecules in the liquid crystal layer 70C are caused to rotate in a plane parallel to the substrate surface. Display operation is performed by using the change in optical transmittance in response to the rotation of the liquid crystal molecules. For example, the first electrode 31 illustrated in FIG. 32 corresponds to the aforementioned common electrode COM, and the second electrode 32 corresponds to the aforementioned pixel electrode. For example, the first electrode 31 is coupled to the drain electrode 90 via the conductive contact 90H.

Second Modification of Second Embodiment

Figure 33:
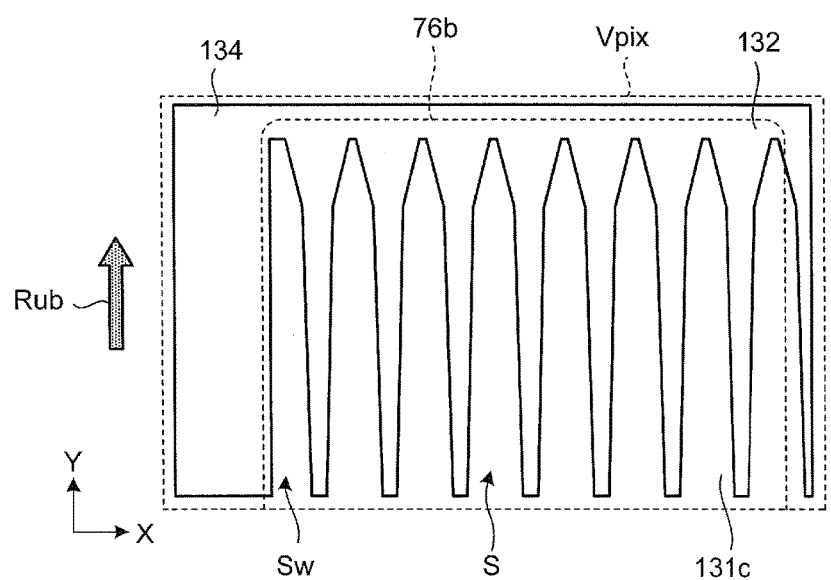
FIG. 33 is a schematic view for explaining a modification of the relationship between the shape of the first electrode and the opening according to the second embodiment.

A description will now be given of a display device 1 according to a second modification of the second embodiment. FIG. 33 is a schematic view for explaining a modification of the relationship between the shape of the first electrode and the opening according to the second embodiment. Constituent elements identical to those described in the above-described first and second embodiments are designated by identical reference numerals to omit redundant description.

The first electrode 31 includes the plurality of comb tooth portions 131 protruding from the electrode base 132 extending in the X direction. The comb tooth portions 131 include comb tooth portions 131c that extend in one direction from the electrode base 132. From one electrode base 132, the comb tooth portions 131c extend in the Y direction. From one electrode base 132, the comb tooth portions 131c may be made to extend in a direction opposite to the Y direction.

Accordingly, the rubbing treatment is applied to the above-described first orientation film 73a in a rubbing direction Rub illustrated in FIG. 33 so that the first orientation film 73a has a predetermined initial orientation in the Y direction. The rubbing treatment is applied to the second orientation film 73b, in a direction antiparallel to the rubbing direction Rub of the first orientation film 73a. The rubbing directions of the first orientation film 73a and the second orientation film 73b are in a relation antiparallel to each other.

Third Modification of Second Embodiment

Figure 34:
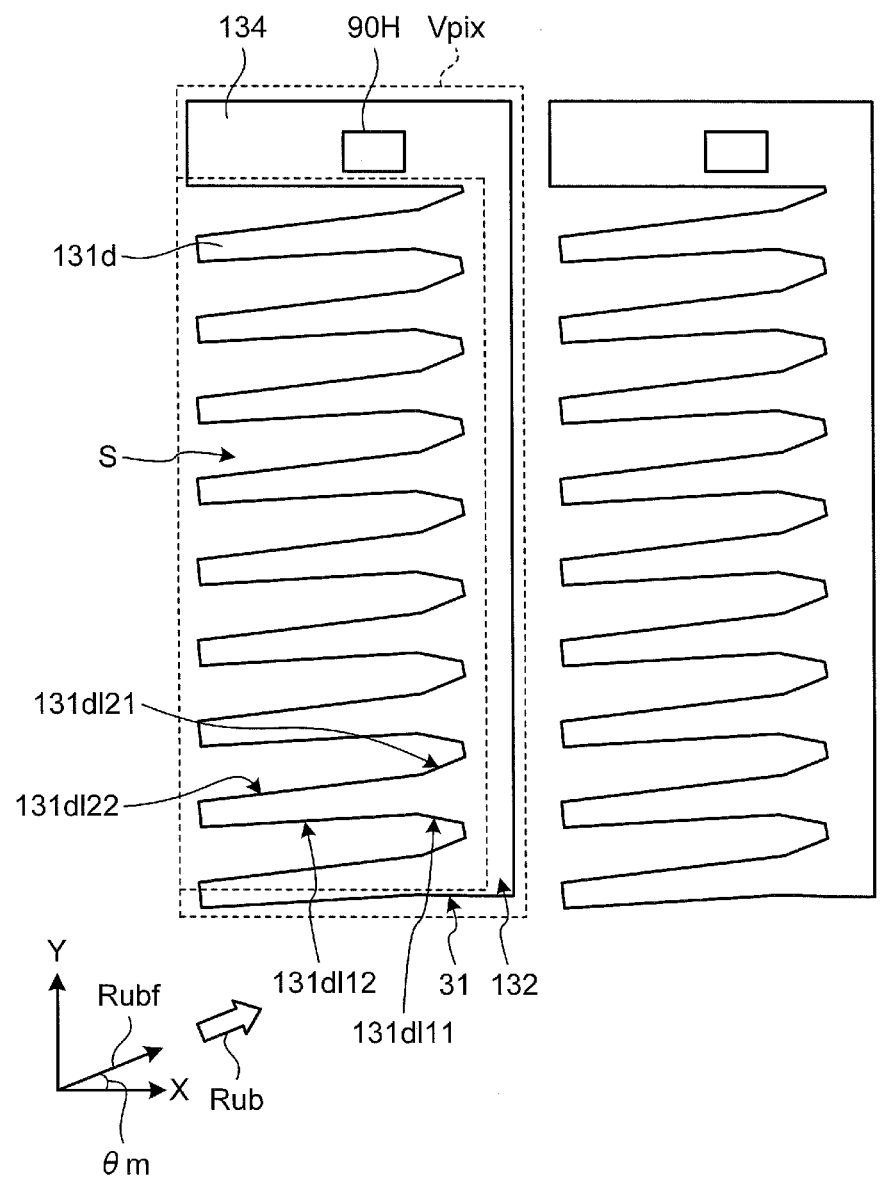
FIG. 34 is a schematic view for explaining a modification of the relationship between the shape of the first electrode and the opening according to the second embodiment.

A description will now be given of a display device 1 according to a third modification of the second embodiment. FIG. 34 is a schematic view for explaining the relationship between the shape of the first electrode and the opening according to the third modification of the second embodiment. Constituent elements identical to those described in the above-described first and second embodiments are designated by identical reference numerals to omit redundant description.

In the display device 1 according to the third modification of the second embodiment, an electric field (transverse electric field) is generated between the first electrode 31 and the second electrode 32 which are laminated in the direction (Z direction) perpendicular to the surface of the TFT substrate 71 of the pixel substrate 70A. Since the electric field is generated in the direction parallel to the TFT substrate 71, the liquid crystal molecules in the liquid crystal layer 70C are caused to rotate in a plane parallel to the substrate surface. Display operation is performed by using the change in optical transmittance in response to the rotation of the liquid crystal molecules. For example, the first electrode 31 illustrated in FIG. 34 corresponds to the aforementioned pixel electrode, and the first second electrode 32 corresponds to the aforementioned common electrode COM. For example, the first electrode 31 is coupled to the drain electrode 90 via the conductive contact 90H. The first electrode 31 includes the plurality of comb tooth portions 131d protruding from the electrode base 132 extending in the Y direction. The plurality of adjacent comb tooth portions 131d protrude from the electrode base 132 at constant intervals. From one electrode base 132, the comb tooth portions 131d extend in a Rubf direction. The Rubf direction in which the comb tooth portions 131d extend has an angle θm with respect to the X direction (or the Y direction).

In the display device 1 according to the third modification of the second embodiment, either the first electrodes 31 or the second electrodes 32 correspond to pixel electrodes which are sectioned in accordance with the respective pixels Vpix. The pixel electrodes are arranged in a matrix form in the X direction and Y direction. The Rubf direction in which the comb tooth portions 131d extend is different from the row or column direction in which the pixel electrodes arranged. Accordingly, when a display area section 21 of the display device 1 according to the third modification of the second embodiment is viewed with use of a polarized sunglass to assist visual confirmation or to provide eye protection, it is possible to suppress the phenomenon in which the display area section 21 is mostly blocked by the polarized sunglass to cause degraded contrast and luminance, resulting in difficulty in viewing what is displayed on the display area section 21.

Figure 35:
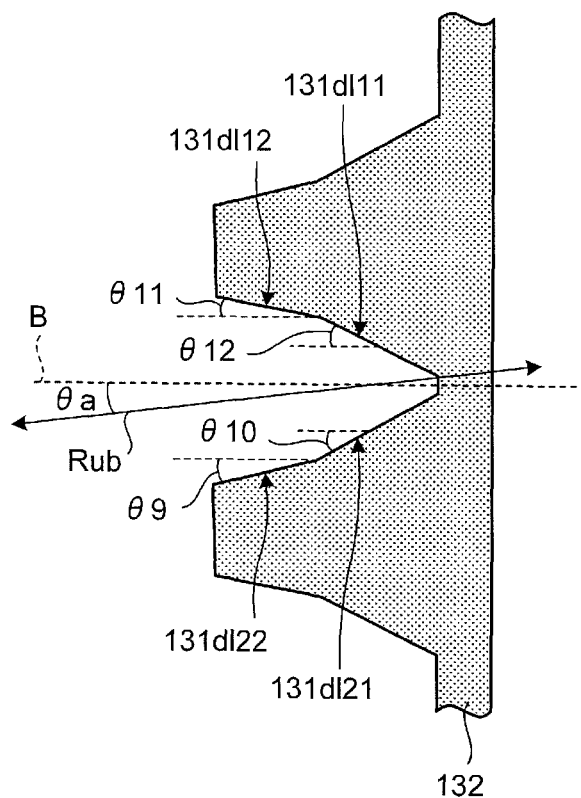
FIG. 35 is a schematic view for explaining a modification of the relationship between the shape of the first electrode and the opening according to the second embodiment.

FIG. 35 is a schematic view illustrating a principal part of FIG. 34. In FIG. 35, a direction B in which the comb tooth portions 131d extend is displaced from the rubbing direction Rub by an angle θa. It is assumed that an angle between a distal end-side part 131d/12 of a right long side of the comb tooth portion 131d and the direction B is represented by θ9, an angle between a base-side part 131d/11 of the right long side of the comb tooth portion 131d and the direction B is represented by θ10, an angle between a distal end-side part 131d/22 of a left long side of the comb tooth portion 131d and the direction B is represented by θ11, and an angle between a base-side part 131d/21 of the left long side of the comb tooth portion 131d and the direction B is represented by θ12. In this case, formulas (1) to (4) may preferably be satisfied. In addition, formulas (5) to (7) may more preferably be satisfied. In these formulas, A represents a constant with an angle dimension.

$$\theta a \leq \theta 9 \tag{1}$$

$$\theta a \leq \theta 11 \tag{2}$$

$$\theta 9 < \theta 10 \tag{3}$$

$$\theta 11 < \theta 12 \tag{4}$$

$$\theta a = (\theta 9 - \theta 11)/2 \tag{5}$$

$$\theta 9 = A + \theta a \tag{6}$$

$$\theta 11 = A - \theta a \tag{7}$$

In the display device 1, the angles θ10 and θ12 on the base side of the comb tooth portion 131d, which is low in contribution to optical transmittance, are made larger to regulate the liquid crystal molecular orientation and to trigger the liquid crystal rotation, so that the stability in liquid crystal molecular orientation is improved. At the same time, in the display device 1, the angles θ9 and θ11 on the distal end side of the comb tooth portion 131d are made smaller to improve the optical transmittance. As a consequence, the display device 1 can harmonize the improvement in stability of liquid crystal molecular orientation and improvement in optical transmittance.

When the angle θa between the direction B and the rubbing direction Rub is 0 (zero), the comb tooth portions 131d may be arranged in line symmetry with respect to the direction B (rubbing direction Rub). In short, following formulas (8) and (9) may preferably be satisfied. As a consequence, the display device 1 can harmonize the improvement in stability of liquid crystal molecular orientation and improvement in optical transmittance.

$$\theta 9 = \theta 11 \tag{8}$$

$$\theta 10 = \theta 12 \tag{9}$$

2. APPLICATION EXAMPLES

A description will now be given of application examples of the display device 1 described in any one of the first and second embodiments and their modifications with reference to FIGS. 36 to 49. Hereinafter, the first and second embodiments and their modifications are collectively referred to as the present embodiment. FIGS. 36 to 49 illustrate examples of an electronic apparatus to which the display device according to any of the embodiments is applied. The display device 1 according to any of the embodiments is applicable to electronic apparatuses in any fields, such as portable electronic apparatuses including a mobile phone and a smartphone, a television set, a digital camera, a notebook personal computer, a video camera, and a meter provided in vehicles. In other words, the display device 1 according to any of the embodiments is applicable to electronic apparatuses in any fields which display video signals inputted from the outside or image signals generated inside as an image or a video. The electronic apparatuses include a controller that supplies video signals to a display device and controls operation of the display device.

2-1. First Application Example

Figure 36:
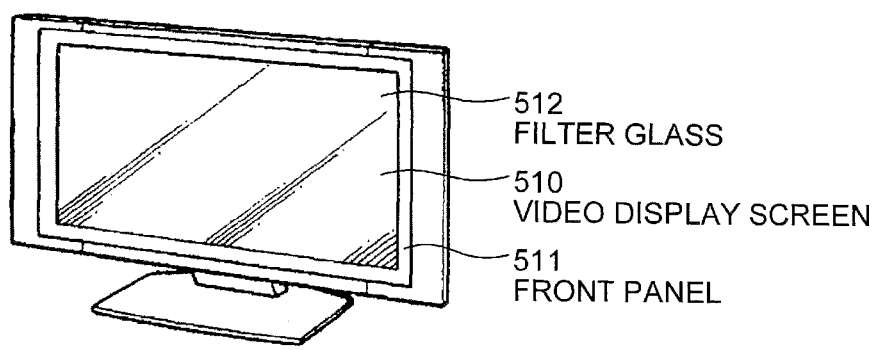
FIG. 36 is a view illustrating one example of an electronic apparatus to which the display device according to any of the embodiments is applied.

An electronic apparatus illustrated in FIG. 36 is a television set to which the display device 1 according to any of the embodiments is applied. For example, the television set has a video display screen 510 including a front panel 511 and a filter glass 512. The video display screen 510 is the display device according any of to the embodiments.

2-2. Second Application Example

Figure 37:
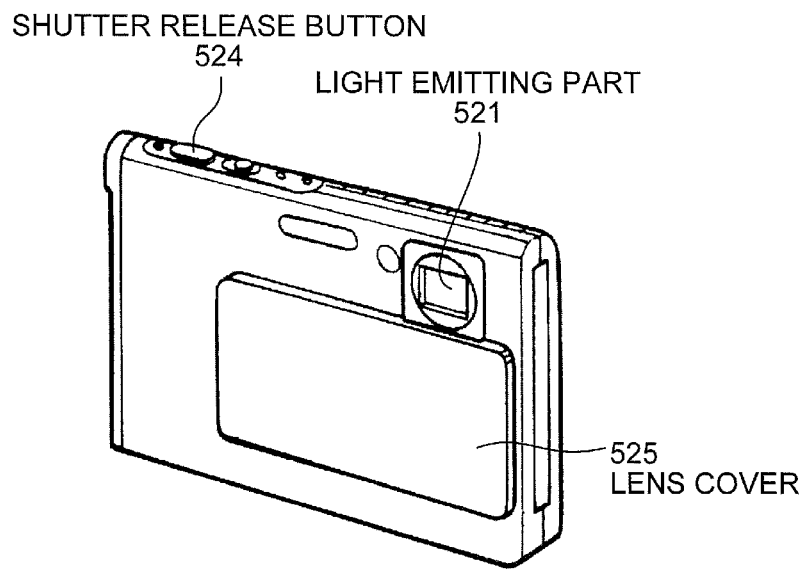
FIG. 37 is a view illustrating one example of the electronic apparatus to which the display device according to any of the embodiments is applied.
Figure 38:
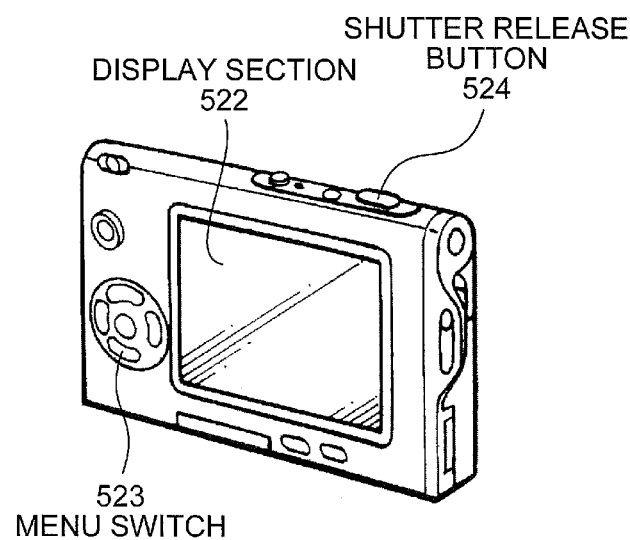
FIG. 38 is a view illustrating one example of the electronic apparatus to which the display device according to any of the embodiments is applied.

An electronic apparatus illustrated in FIGS. 37 and 38 is a digital camera to which the display device 1 according to any of the embodiments is applied. For example, the digital camera has a light emitting part 521 for flashing, a display section 522, a menu switch 523, and a shutter release button 524. The display section 522 is the display device according to any of the embodiments. As illustrated in FIG. 37, the digital camera has a lens cover 525. A photographic lens is exposed when the lens cover 525 is slid. The digital camera can take a digital photograph by imaging the light which is incident through the photographic lens.

2-3. Third Application Example

Figure 39:
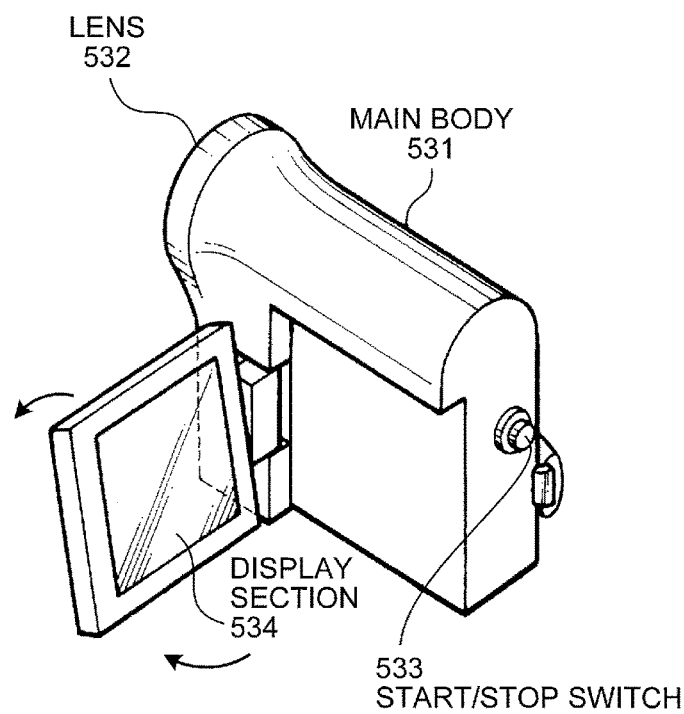
FIG. 39 is a view illustrating one example of the electronic apparatus to which the display device according to any of the embodiments is applied.

FIG. 39 illustrates the external appearance of an electronic apparatus that is a video camera to which the display device 1 according to any of the embodiments is applied. For example, the video camera includes a main body 531, a subject photographing lens 532 provided on a front lateral surface of the main body 531, a start/stop switch 533 for photographing, and a display section 534. The display section 534 is the display device according to any of the embodiments.

2-4. Fourth Application Example

Figure 40:
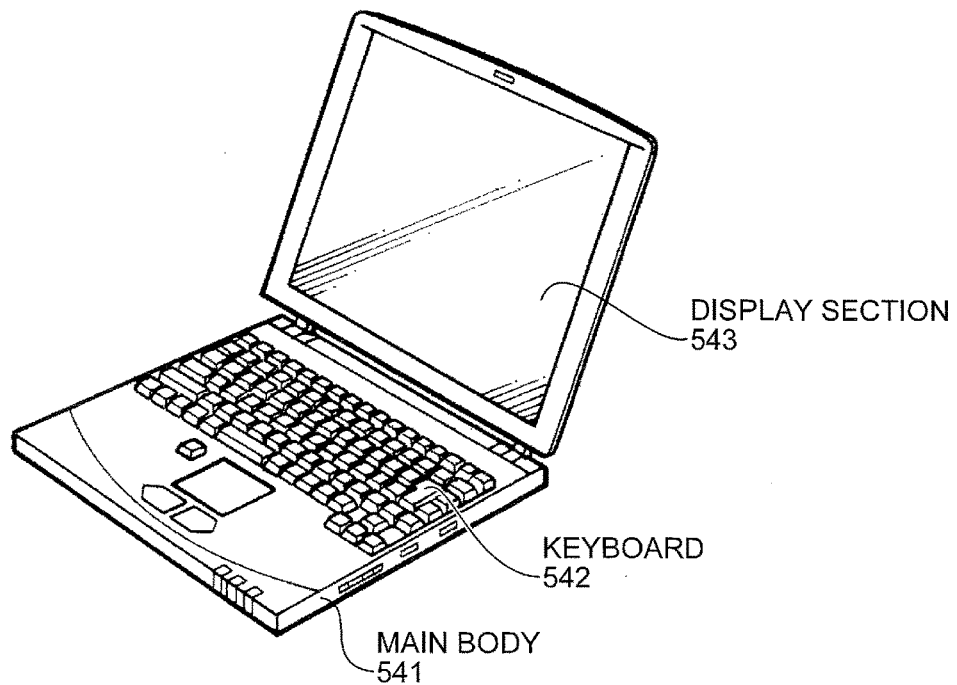
FIG. 40 is a view illustrating one example of the electronic apparatus to which the display device according to any of the embodiments is applied.

An electronic apparatus illustrated in FIG. 40 is a notebook personal computer to which the display device 1 according to any of the embodiments is applied. For example, the notebook personal computer has a main body 541, a keyboard 542 for inputting alphabetic characters and the like, and a display section 543 that displays an image. The display section 543 is formed of the display device according to any of the embodiments.

2-5. Fifth Application Example

Figure 41:
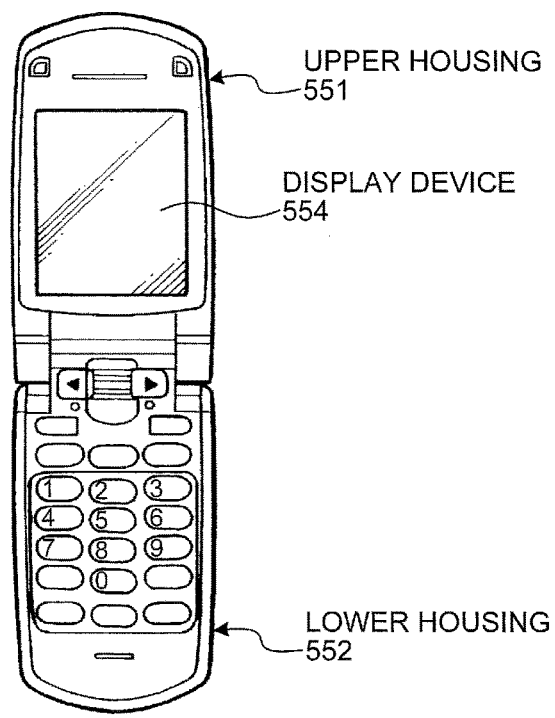
FIG. 41 is a view illustrating one example of the electronic apparatus to which the display device according to any of the embodiments is applied.
Figure 42:
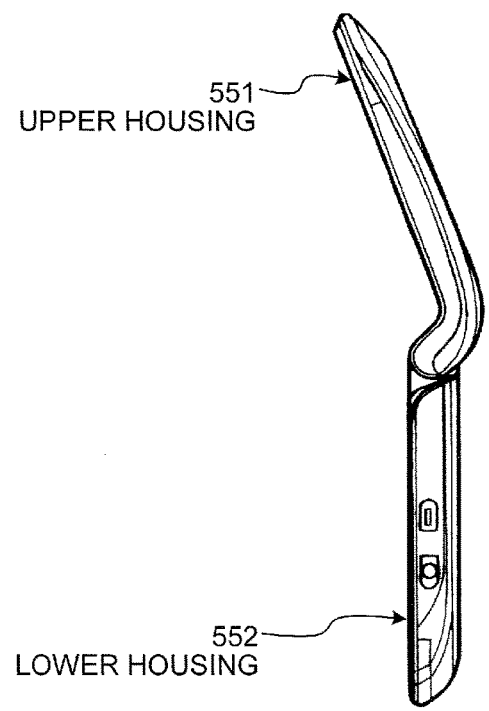
FIG. 42 is a view illustrating one example of the electronic apparatus to which the display device according to any of the embodiments is applied.
Figure 43:
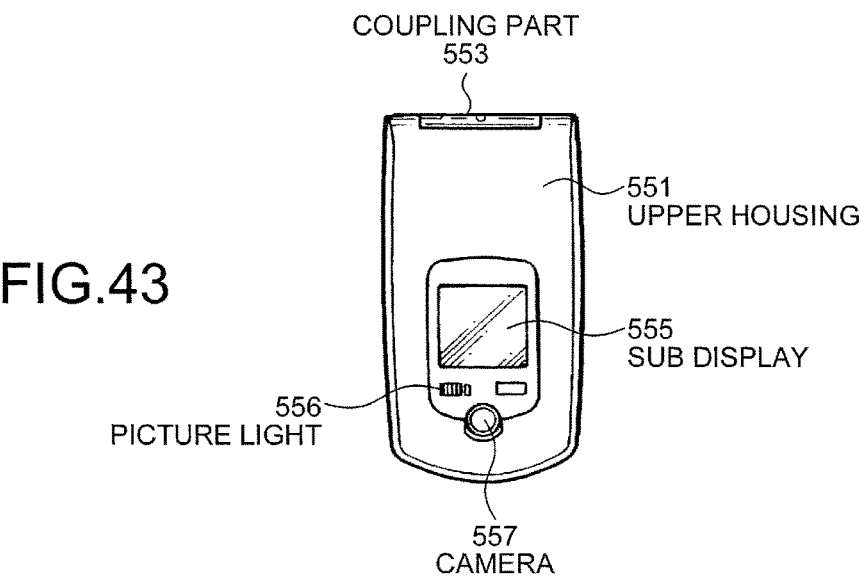
FIG. 43 is a view illustrating one example of the electronic apparatus to which the display device according to any of the embodiments is applied.
Figure 44:
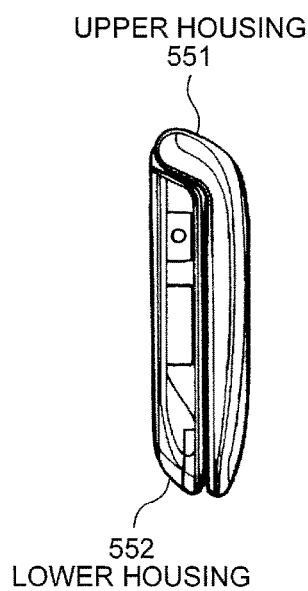
FIG. 44 is a view illustrating one example of the electronic apparatus to which the display device according to any of the embodiments is applied.
Figure 45:
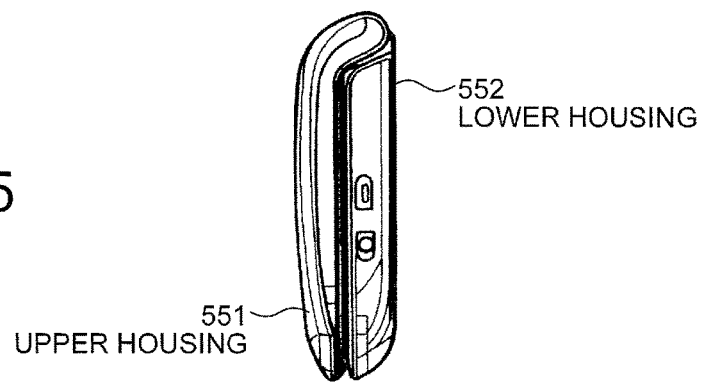
FIG. 45 is a view illustrating one example of the electronic apparatus to which the display device according to any of the embodiments is applied.
Figure 46:
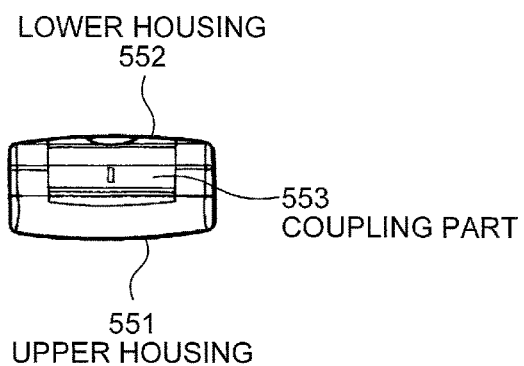
FIG. 46 is a view illustrating one example of the electronic apparatus to which the display device according to any of the embodiments is applied.
Figure 47:
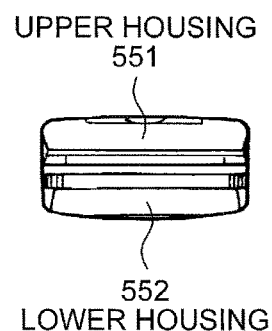
FIG. 47 is a view illustrating one example of the electronic apparatus to which the display device according to any of the embodiments is applied.

The electronic apparatus illustrated in FIGS. 41 to 47 is a mobile telephone to which the display device 1 is applied. FIG. 41 is a front view of the mobile telephone in an opened state, FIG. 42 is a right side view of the mobile telephone in the opened state, FIG. 43 is a front view of the mobile telephone in a folded state, FIG. 44 is a left side view of the mobile telephone in the folded state, FIG. 45 is a right side view of the mobile telephone in the folded state, FIG. 46 is a plan view of the mobile telephone in the folded state, and FIG. 47 is a bottom view of the mobile telephone in the folded state. For example, the mobile telephone includes an upper housing 551, a lower housing 552, and a coupling part (hinge unit) 553 coupling the upper housing 551 and the lower housing 552. The mobile telephone has a display 554, a sub display 555, a picture light 556, and a camera 557. The display device 1 is mounted as the display 554. Accordingly, the display 554 of the mobile telephone may have a function of detecting touch operation in addition to the function of displaying an image.

2-6. Sixth Application Example

Figure 48:
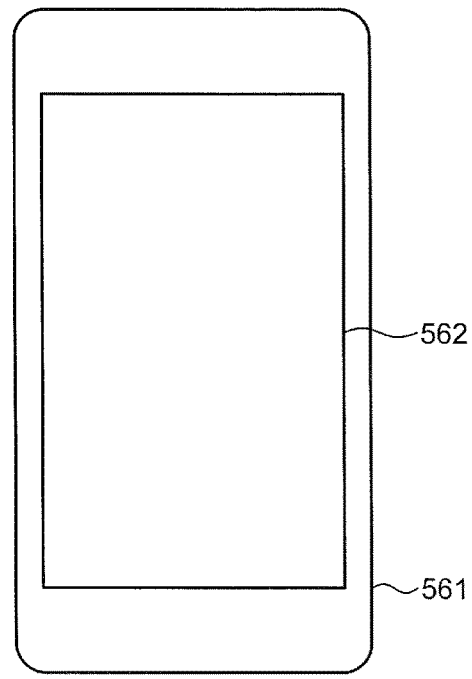
FIG. 48 is a view illustrating one example of the electronic apparatus to which the display device according to any of the embodiments is applied.

An electronic apparatus illustrated in FIG. 48 is a personal digital assistant that operates as a portable computer, a multifunctional mobile phone, a portable computer that enables voice communication, or a portable computer that enables data communication. The personal digital assistant is also referred to as a smartphone and a tablet terminal. For example, the personal digital assistant has a display section 562 on the surface of a housing 561. The display section 562 is the display device according to any of the embodiments.

2-7. Seventh Application Example

Figure 49:
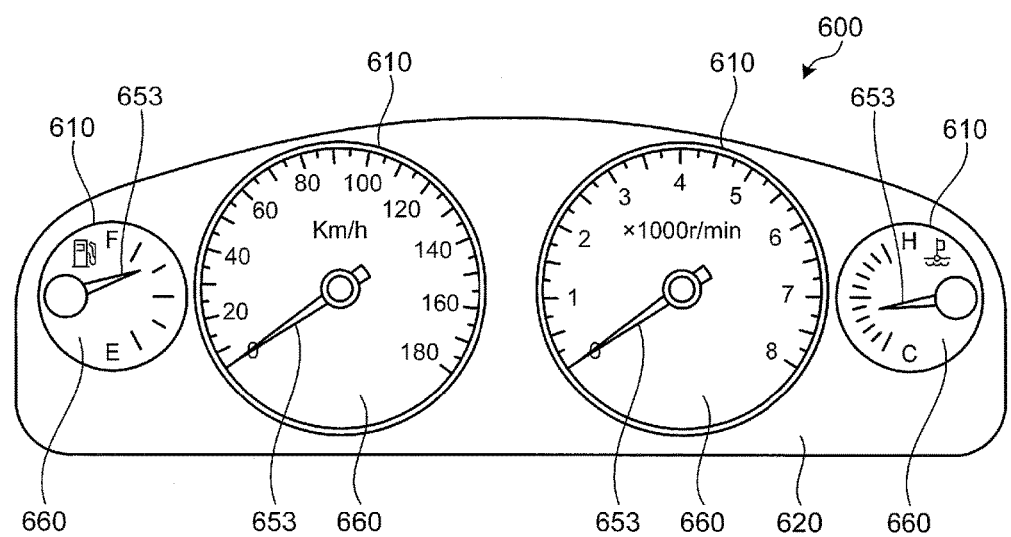
FIG. 49 is a view illustrating one example of the electronic apparatus to which the display device according to any of the embodiments is applied.

An electronic apparatus illustrated in FIG. 49 is a meter unit mounted on a vehicle. The meter unit (electronic apparatus) 600 illustrated in FIG. 49 includes a plurality of liquid crystal display devices 610, such as a fuel gauge, a water thermometer, a speedometer, and a tachometer. The plurality of liquid crystal display devices 610 are covered with one outer panel 620.

Each of the liquid crystal display devices 610 illustrated in FIG. 49 includes a liquid crystal panel 660 as a liquid crystal display means and a movement mechanism as an analog display means, which are combined with each other. The movement mechanism has a motor as a driving means and an indicator 653 that is rotated by the motor. As illustrated in FIG. 49, the liquid crystal display device 610 can display a scale, an alarm and the like on the display surface of the liquid crystal panel 660. In the liquid crystal display device 610, the indicator 653 of the movement mechanism can rotate on a display surface side of the liquid crystal panel 660. The display device 1 according to any of the embodiments is applied to the liquid crystal display device 610.

Although the plurality of liquid crystal display devices 610 are provided for one outer panel 620 in FIG. 49, the present disclosure is not limited to this configuration. One liquid crystal display device may be provided in a region surrounded with the outer panel, and a fuel gauge, a water thermometer, a speedometer, a tachometer and the like may be displayed on this liquid crystal display device.

What is claimed is:

1. A display device, comprising:
   a first substrate that has a first electrode and a second electrode,
      the first electrode including an electrode base extending in a first direction and a plurality of comb tooth portions protruding from the electrode base and extending in a second direction different from the first direction, and
      the second electrode facing the comb tooth portions via an insulating film;
   a second substrate that faces the first substrate; and
   a liquid crystal layer disposed between the first substrate and the second substrate and including a plurality of liquid crystal molecules oriented to the second direction in a non-voltage applied state, wherein
   each of the comb tooth portions has a base segment that is arranged on a base side of the comb tooth portion, and the base segment has two sides each of which forms a base angle with respect to the second direction, the base angle is smaller than a right angle, each of the comb tooth portions has a distal segment that is arranged on a distal side of the comb tooth portion, and the distal segment has two sides each of which forms a distal angle with respect to the second direction, and the distal angle is smaller than the right angle.

2. The display device according to claim 1, wherein the base angle is larger than the distal angle.

3. The display device according to claim 2, wherein each of the comb tooth portions has a shape substantially symmetric with respect to an axis in the second direction.

4. The display device according to claim 3, wherein when a voltage is not applied to the first electrode and the second electrode, the major axes of the liquid crystal molecules are oriented so as to be aligned in the second direction, whereas when a voltage is applied between the first electrode and the second electrode, the major axes of the liquid crystal molecules are oriented so as to rotate, in an in-plane direction of the first substrate, clockwise in a vicinity of one side of the comb tooth portion and counterclockwise in a vicinity of the other side of the comb tooth portion.

\* \* \* \* \*